(12) United States Patent
Ijima et al.

(10) Patent No.: US 6,597,642 B1
(45) Date of Patent: Jul. 22, 2003

(54) PHOTODETECTOR UNIT, AND OPTICAL PICKUP, OPTICAL REPRODUCTION APPARATUS, AND OPTICAL RECORDING APPARATUS EQUIPPED WITH THE SAME

(75) Inventors: Shinichi Ijima, Takatsuki (JP); Shoichi Takasuka, Osaka (JP); Hideyuki Nakanishi, Otsu (JP); Akio Yoshikawa, Kyotanabe (JP)

(73) Assignee: Matsushita Electric Industrial Co., LTD, Osaka-Fu (JP)

( * ) Notice: Subject to any disclaimer, the term of this patent is extended or adjusted under 35 U.S.C. 154(b) by 407 days.

(21) Appl. No.: 09/709,929

(22) Filed: Nov. 10, 2000

(30) Foreign Application Priority Data

Nov. 12, 1999 (JP) .............................. 11-323304

(51) Int. Cl.$^7$ ................................. G11B 7/00
(52) U.S. Cl. ................. 369/44.11; 369/44.41; 369/120; 369/109.1
(58) Field of Search ............. 369/44.11, 44.42, 369/44.41, 109.1, 109.02, 112.01, 112.1, 112.11, 112.12, 112.15, 120

(56) References Cited

U.S. PATENT DOCUMENTS 6,111,842 A * 8/2000 Nishino et al. ............. 369/118

* cited by examiner

Primary Examiner—Nabil Hindi

(57) ABSTRACT

An optical pickup that is equipped with a photodetector unit, irradiates an optical disc with a laser beam, and receives returning light reflected by the optical disc, where the optical pickup is constructed to (1) divide the laser beam into a main beam, a preceding sub-beam, and a succeeding sub-beam, (2) direct the main beam, the preceding sub-beam, and the succeeding sub-beam toward the optical disc, and (3) divide returning lights of the main beam, the preceding sub-beam, and the succeeding sub-beam respectively into first-fourth main returning lights, first-fourth preceding returning lights, and first-fourth succeeding returning lights, and the photodetector unit includes: first-fourth main photodetectors that respectively receive the first-fourth main returning lights; first-fourth preceding photodetectors that respectively receive the first-fourth preceding returning lights; and first-fourth succeeding photodetectors that respectively receive the first-fourth succeeding returning lights. A tracking error signal appropriate to the optical disc to be reproduced is selected from three tracking error signals detected according to the detection signals from the photodetectors, and a tracking servo is driven according to the selected tracking error signal.

40 Claims, 27 Drawing Sheets

Fig. 14

| | JUDGEMENT RESULTS OF TRACKING ERROR SIGNALS | | | | | (PHYSICAL SHAPE) PIT/GROOVE:PHASE DEPTH:DENSITY | MEDIA TYPE | LASER SELECTION | TES SELECTION |
|---|---|---|---|---|---|---|---|---|---|
| | TES1a DIFFERENTIAL PP (RED) | TES2a PHASE COMPARISON (RED) | TES3a (3-BEAM RED) | TES1b DIFFERENTIAL PP (INFRARED) | TES2b PHASE COMPARISON (INFRARED) | TES3b (3-BEAM INFRARED) | | | |
| a | × | ○ | ◎ | × | ○ | ◎ | PRE-PIT:AROUND λ/4: LOW DENSITY | CD-ROM, Pre-Mastered MD CD-ROM | (RED) INFRARED | 3-BEAM |
| b | ○ | △ | ◎ | ○ | △ | ◎ | PRE-PIT:OTHER THAN λ/4: LOW DENSITY | CD-ROM, Pre-Mastered MD(PIT) | (RED) INFRARED | 3-BEAM |
| c | × | × | ◎ | × | × | ◎ | CONTINUOUS GROOVE: AROUND λ/4:LOW DENSITY | - | (RED) INFRARED | 3-BEAM DIFFERENTIAL PP |
| d | ○ | × | × | ○ | × | ◎ | CONTINUOUS GROOVE: OTHER THAN λ/4:LOW DENSITY | Rewritable MD CONTINUOUS GROOVE | (RED) INFRARED | 3-BEAM DIFFERENTIAL PP |
| e | × | × | × | ○ | × | ◎ | CONTINUOUS GROOVE: OTHER THAN λ/4: LOW DENSITY:WRITE-ONCE TYPE | - | INFRARED | BEAM DIFFERENTIAL PP |
| f | × | × | × | ○ | × | × | CONTINUOUS GROOVE: OTHER THAN λ/4: LOW DENSITY: WRITE-ONCE TYPE | CD-R(DURING REPRODUCTION) | INFRARED | DIFFERENTIAL PP |
| g | × | ○ | * | × | × | × | PRE-PIT:AROUND λ/4: HIGH DENSITY | CD-R(DURING RECORDING) | RED | PHASE COMPARISON |
| h | ○ | △ | * | × | × | × | PRE-PIT:OTHER THAN λ/4: HIGH DENSITY | DVD-ROM | RED | DIFFERENTIAL PP |
| i | × | × | * | × | × | × | CONTINUOUS GROOVE: AROUND λ/4:HIGH DENSITY | - | - | - |
| j | ○ | × | * | × | × | × | CONTINUOUS GROOVE: OTHER THAN λ/4:HIGH DENSITY | DVD-RAM, Pre-Mastered MD data2 | RED | DIFFERENTIAL PP |
| k | ○ | × | × | × | × | × | CONTINUOUS GROOVE: OTHER THAN λ/4:HIGH DENSITY:WRITE-ONCE TYPE | DVD-R | RED | DIFFERENTIAL PP |

PHOTODETECTOR UNIT, AND OPTICAL PICKUP, OPTICAL REPRODUCTION APPARATUS, AND OPTICAL RECORDING APPARATUS EQUIPPED WITH THE SAME

BACKGROUND OF THE INVENTION

1. Field of the Invention

The present invention relates to an optical reproduction apparatus that is used to read information from optical recording media, an optical recording apparatus that is used to write information onto optical recording media, an optical pickup, and a photodetector unit.

2. Description of the Related Art

In recent years, various standards adopting different physical formats have been created for optical recording media. For instance, optical recording media based on different standards have different recording densities. This generates demand for a multi-standard optical reproduction apparatus that can reproduce various types of optical recording media having different physical formats.

A multi-standard optical reproduction apparatus, which reproduces optical recording media having different recording densities, is disclosed by Japanese Laid-Open Patent Application No. H9-180212.

In this conventional optical reproduction apparatus, a photodetector unit for receiving returning light reflected by an optical recording medium includes a plurality of photodetectors to obtain received light signals for a three-beam method and received light signals for a differential phase detection method. Here, each of these methods is used to detect a tracking error signal for driving a tracking servo. The three-beam method is used for low-density optical recording media (conventional CD-ROMs), while the differential phase detection method is used for high-density optical recording media (DVD-ROMs).

The optical reproduction apparatus first receives a user's specification showing whether an optical recording medium placed therein has a high recording density. If the optical recording medium has a high recording density, the optical reproduction apparatus detects a tracking error signal according to the differential phase detection method. If the optical recording medium has a low recording density, the optical reproduction apparatus detects a tracking error signal according to the three-beam method. The optical reproduction apparatus then drives its tracking servo using the detected tracking error signal.

By selectively using the three-beam method and the differential phase detection method to detect tracking error signals in this manner, the conventional optical reproduction apparatus reproduces both of low-density optical recording media, such as CD-ROMS, and high-density optical recording media, such as DVD-ROMs.

As described above, the conventional optical reproduction apparatus is capable of reproducing optical recording media (such as CD-ROMs and DVD-ROMs) having different recording densities. However, it is difficult for this reproduction apparatus to support other types of optical recording media that have recently become available.

More specifically, because recent optical recording media adopt various physical formats having different track pitches and different track shapes (pit sequences or continuous grooves), it is difficult to reproduce these optical recording media with a single optical reproduction apparatus. As a result, a plurality of optical reproduction apparatuses need to be used to reproduce the different types of optical recording media, which puts an enormous economic burden upon consumers. The same problem applies to optical recording apparatuses.

SUMMARY OF THE INVENTION

The first object of the present invention is to provide a photodetector unit that is suitable for the reproduction of or recording onto various types of optical recording media that have different track shapes and different track pitches. The second object of the present invention is to provide an optical pickup that is equipped with the photodetector unit and is capable of reproducing or recording onto various types of optical recording media. The third object of the present invention is to provide an optical reproduction apparatus that is suitable for the reproduction of various types of optical recording media. The fourth object of the present invention is to provide an optical recording apparatus that is suitable for the recording onto various types of optical recording media.

The first object is achieved by a photodetector unit for use with an optical pickup that irradiates an optical recording medium with a laser beam and receives returning light reflected by the optical recording medium, where the optical pickup is constructed to (1) divide the laser beam into a main beam, a preceding sub-beam, and a succeeding sub-beam, (2) direct the main beam, the preceding sub-beam, and the succeeding sub-beam toward the optical recording medium, and (3) divide returning lights of the main beam, the preceding sub-beam, and the succeeding sub-beam respectively into first-fourth main returning lights, first-fourth preceding returning lights, and first-fourth succeeding returning lights, and the photodetector unit includes: first-fourth main photodetectors that respectively receive the first-fourth main returning lights; first-fourth preceding photodetectors that respectively receive the first-fourth preceding returning lights; and first-fourth succeeding photodetectors that respectively receive the first-fourth succeeding returning lights.

This construction allows the photodetector unit to detect at least three types of tracking error signals by combining the received light signals from a plurality of photodetector groups. Therefore, the optical pickup equipped with this photodetector unit appropriately drives the focusing servo and tracking servo according to the tracking error signal corresponding to the type of the optical recording medium.

Here, the first-fourth main photodetectors may be arranged in a virtually straight line, and each of the first-fourth main photodetectors may include at least two photodetecting portions arranged perpendicular to an arrangement direction of the first-fourth main photodetectors. The photodetector unit may further include: a first wiring group that includes first signal lines and transmits a received light signal used to perform a push-pull method, the first signal lines being respectively connected to the photodetecting portions of the first-fourth main photodetectors, the first-fourth preceding photodetectors, and the first-fourth succeeding photodetectors; a second wiring group that includes second signal lines and transmits a received light signal used to perform a differential phase detection method, the second signal lines being respectively connected to the photodetecting portions of the first-fourth main photodetectors; and a third wiring group that includes third signal lines and transmits a received light signal used to perform a three-beam method, the third signal lines being respectively connected to the first-fourth preceding photodetectors and the first-fourth succeeding photodetectors.

With this construction, the first-third wiring groups output received light signals respectively appropriate to the push-pull method, differential phase detection method, and three-beam method that are tracking error signal detection methods.

Here, the photodetector unit may further include: a first circuit that generates a first tracking error signal from the received light signal, which is transmitted from the first wiring group, according to the push-pull method; a second circuit that generates a second tracking error signal from the received light signal, which is transmitted from the second wiring group, according to the differential phase detection method; and a third circuit that generates a third tracking error signal from the received light signal, which is transmitted from the third wiring group, according to the three-beam method.

With this construction, the first-third circuits independently generate the first-third tracking error signals according to the push-pull method, differential phase detection method, and three-beam method.

The first object is also achieved by a photodetector unit for use with an optical pickup that irradiates an optical recording medium with a laser beam and receives returning light reflected by the optical recording medium, where the optical pickup is constructed to (1) divide the laser beam into a main beam, a preceding sub-beam, and a succeeding sub-beam, (2) direct the main beam, the preceding sub-beam, and the succeeding sub-beam toward the optical recording medium, and (3) divide returning lights of the main beam, the preceding sub-beam, and the succeeding sub-beam respectively into first-fourth main returning lights, first-fourth preceding returning lights, and first-fourth succeeding returning lights, and the photodetector unit includes: first-fourth main photodetectors that are arranged in a virtually straight line and respectively receive the first-fourth main returning lights; first-fourth preceding photodetectors that are arranged in a virtually straight line and parallel to an array of the first-fourth main photodetectors on a side of the array, the first-fourth preceding photodetectors respectively receiving the first-fourth preceding returning lights; first-fourth succeeding photodetectors that are arranged in a virtually straight line and parallel to the array of the first-fourth main photodetectors on an opposite side of the array, the first-fourth succeeding photodetectors respectively receiving the first-fourth succeeding returning lights; a current-voltage conversion circuit group that converts current signals, which are obtained from the photodetectors and correspond to received light amounts, into received light signals representing voltage values corresponding to the received light amounts; a first wiring group that transmits a first received light signal group used to perform a push-pull method, the first received light signal group corresponding to photodetecting portions of the first-fourth main photodetectors, the first-fourth preceding photodetectors, and the first-fourth succeeding photodetectors; a second wiring group that transmits a second received light signal group used to perform a differential phase detection method, the second received light signal group corresponding to the photodetecting portions of the first-fourth main photodetectors; and a third wiring group that transmits a third received light signal group used to perform a three-beam method, the third received light signal group corresponding to the first-fourth preceding photodetectors and the first-fourth succeeding photodetectors, where the photodetectors, the current-voltage conversion circuit group, and the wiring groups are integrally formed on a single semiconductor substrate.

With this construction, the optical reproduction apparatus equipped with the present photodetector unit is capable of using a plurality of tracking error signal detection methods by combining the received light signals of the photodetector groups. This allows the optical reproduction apparatus to support various types of optical recording media having different track shapes and different track pitches. Also, because the photodetectors, current-voltage conversion circuit group, and wiring groups are integrally formed on the same semiconductor substrate with a semiconductor processing technique, the photodetector unit is produced with high accuracy and the number of parts and cost of the photodetector unit are reduced.

Here, a second semiconductor laser element may be further provided on the substrate, the second semiconductor laser element emitting a laser beam virtually perpendicular to the surface of the substrate, the first and second semiconductor laser elements emitting laser beams of different wavelengths.

With this construction, the photodetector unit uses two semiconductor laser elements. This allows two types of tracking error signals to be detected according to each tracking error signal detection method. As a result, the number of types of optical recording media supported by the present photodetector unit is increased, and a semiconductor laser element, which emits the laser beam of a wavelength appropriate to the type of the optical recording medium, is selected during recording or reproduction.

The second object stated above is achieved by an optical pickup that irradiates an optical recording medium with a laser beam and receives each returning light reflected by the optical recording medium, including: a first semiconductor laser element that emits the laser beam; a first diffraction grating that divides the laser beam from the first semiconductor laser element into a main beam, a preceding sub-beam, and a succeeding sub-beam; a lens that has the main beam, preceding sub-beam, and the succeeding sub-beam converge on the optical recording medium; a second diffraction grating that is provided virtually parallel to the first diffraction grating and generates first-fourth main returning lights, first-fourth preceding returning lights, and first-fourth succeeding returning lights by dividing each of returning lights of the main beam, the preceding sub-beam, and the succeeding sub-beam into a first half beam and a second half beam and dividing each of the first and second half beams into two beams; and a photodetector unit that includes first-fourth main photodetectors that respectively receive the first-fourth main returning lights, first-fourth preceding photodetectors that respectively receive the first-fourth preceding returning lights, and first-fourth succeeding photodetectors that respectively receive the first-fourth succeeding returning lights, where photodetecting surfaces of the photodetectors are arranged within virtually the same plane, and the photodetector unit is arranged so that the photodetecting surfaces are positioned virtually parallel to the first diffraction grating.

With this construction, the optical reproduction apparatus equipped with this optical pickup is capable of using a plurality of tracking error signal detection methods by combining the received light signals of the photodetector groups. This achieves an optical pickup that supports various types of optical recording media having different track shapes and different track pitches.

The third object stated above is achieved by an optical reproduction apparatus that reads and reproduces information recorded on an optical recording medium by performing tracking servoing for an optical pickup according to a tracking error signal, the optical reproduction apparatus including: a detection unit for detecting first-third tracking error signals according to different methods; a judging unit for judging which one of the first-third tracking error signals is suitable for a tracking servo according to amplitude levels of the first-third tracking error signals detected while the tracking servo is off; and a selection unit for selecting one of the first-third tracking error signals for the tracking servo according to a judgement result of the judging unit.

By combining the received light signals of the photodetector groups of the photodetector unit, this optical reproduction apparatus is capable of using a plurality of tracking error signal detection methods. With the construction stated above, the optical reproduction apparatus selects a tracking error signal detection method, which is appropriate to the type of the optical recording medium. As a result, the optical reproduction apparatus precisely controls the focusing and tracking operations of the optical pickup and reproduces information on the optical recording medium with accuracy.

The fourth object stated above is achieved by an optical recording apparatus that records information onto an optical recording medium by performing tracking servoing for an optical pickup according to a tracking error signal, the optical recording apparatus including: a detection unit for detecting first-third tracking error signals according to different methods; a judging unit for judging which one of the first-third tracking error signals is suitable for a tracking servo according to amplitude levels of the first-third tracking error signals detected while the tracking servo is off; and a selection unit for selecting one of the first-third tracking error signals for the tracking servo according to a judgement result of the judging unit.

By combining the received light signals of the photodetector groups of the photodetector unit, this optical recording apparatus is capable of using a plurality of tracking error signal detection methods. With the construction stated above, the optical recording apparatus is capable of selecting a tracking error signal detection method, which is appropriate to the type of the optical recording medium. As a result, the optical recording apparatus precisely controls the focusing and tracking operations of the optical pickup and records information onto the optical recording medium with accuracy.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 14 shows an example table where each combination of amplitude judgement results concerning tracking error signals is associated with one physical shape, one media type, one semiconductor laser element, and one tracking error signal;

DESCRIPTION OF THE PREFERRED EMBODIMENTS

<First Embodiment>
<Overview of Construction>

Figure 1:
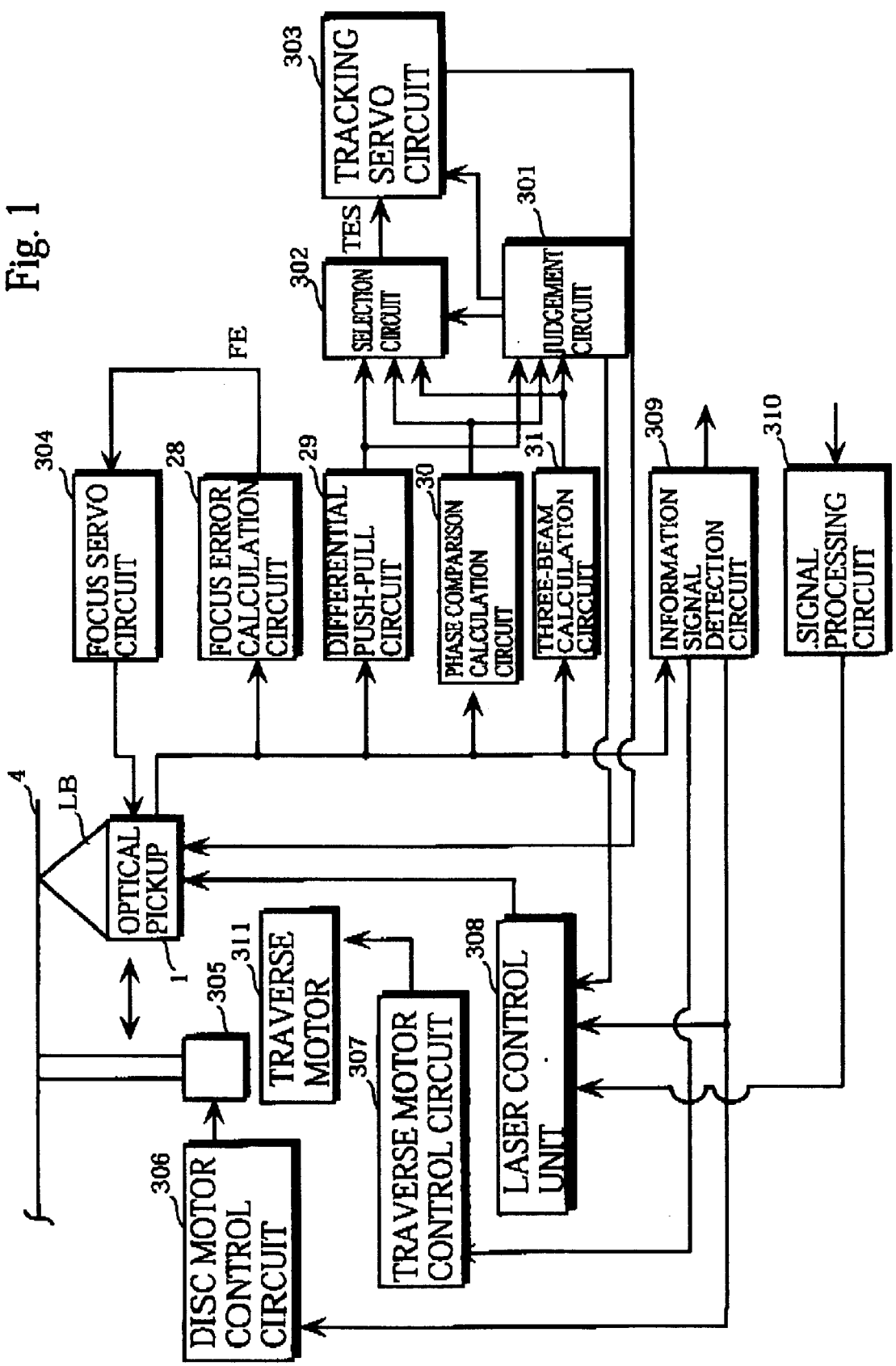
FIG. 1 is a block diagram showing the main construction elements of an optical recording and reproduction apparatus according to the first embodiment of the present invention.

FIG. 1 is a block diagram showing the main construction elements of an optical recording and reproduction apparatus (hereinafter simply referred to as the "optical reproduction apparatus") according to the first embodiment of the present invention.

As shown in this drawing, this optical reproduction apparatus includes an optical pickup 1, a focus error calculation circuit 28, a differential push-pull circuit 29, a phase comparison calculation circuit 30, a three-beam calculation circuit 31, a judgement circuit 301, a selection circuit 302, a tracking servo circuit 303, a focus servo circuit 304, a disc motor 305, a disc motor control circuit 306, a traverse motor control circuit 307, a laser control unit 308, an information signal detection circuit 309, a signal processing circuit 310, and so on.

An optical recording medium 4 is rotated by the disc motor 305 at a predetermined rotational speed. The optical pickup 1 is displaced in the radius direction of the optical recording medium 4 by a publicly known sliding mechanism (not shown) whose power source is a traverse motor 311 including a stepping motor. With this construction, the optical pickup reads information from the optical recording medium 4 or writes information onto the optical recording medium 4.

The information signal detection circuit 309 detects a information signal and an address signal (sub-coding) from a detection signal sent from the optical pickup 1 and outputs the information signal to the outside. Also, the information signal detection circuit 309 outputs the address signal to the disc motor control circuit 306 and the traverse motor control circuit 307.

The disc motor control circuit 306 and the traverse motor control circuit 307 respectively control the disc motor 305 and the stepping motor of the sliding mechanism to have the laser beam LB from the optical pickup 1 appropriately trace the information recording sequences of the optical recording medium 4.

The optical pickup includes an optical system and a photodetector unit. The optical system splits a laser beam into three beams (a main beam, a preceding sub-beam, and a succeeding sub-beam) and directs these beams toward the optical recording medium 4. The optical system also splits each returning light reflected by the optical recording medium 4 into four beams. That is, the optical system splits the returning light of the main beam (hereinafter, the main returning light) into the first-fourth main returning lights, the returning light of the preceding sub-beam (hereinafter, the preceding returning light) into the first-fourth preceding returning lights, and the returning light of the succeeding sub-beam (hereinafter, the succeeding returning light) into the first-fourth succeeding returning lights. The photodetector unit receives these returning lights.

Figure 4:
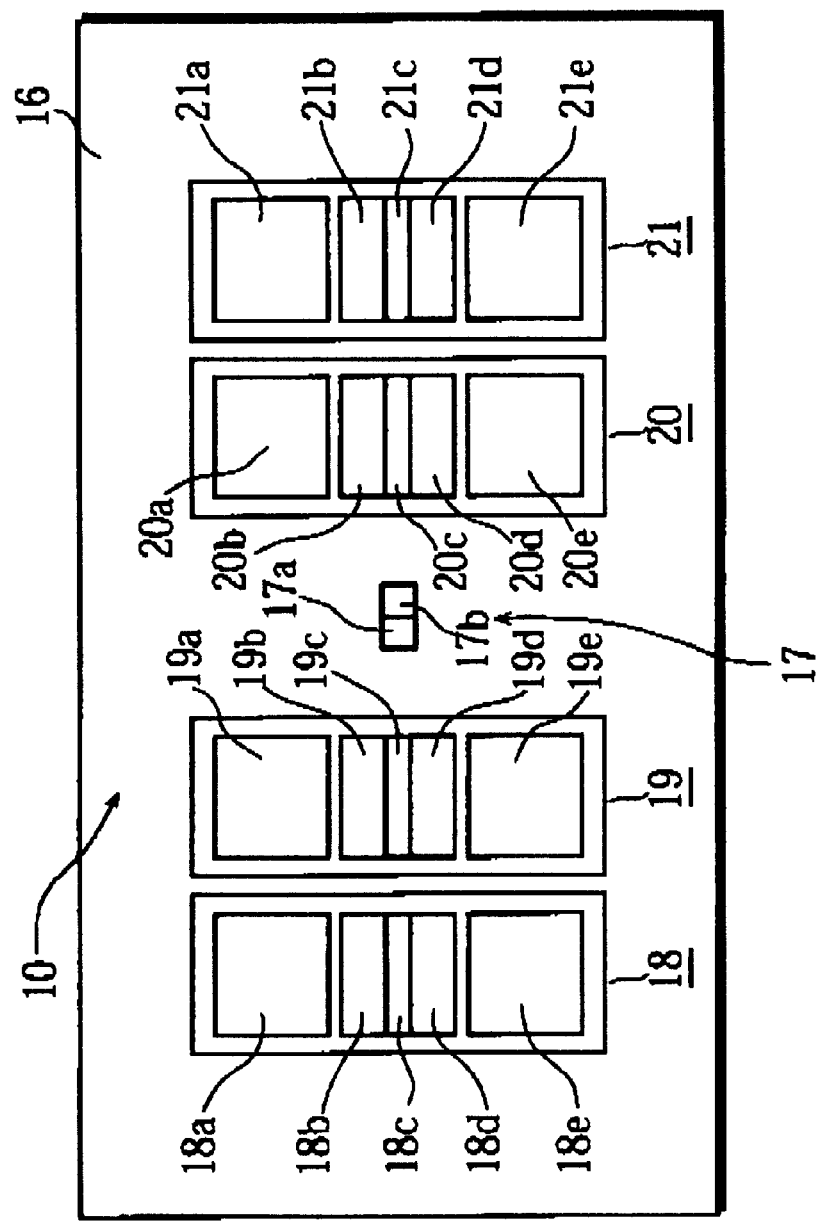
FIG. 4 shows how photodetectors are arranged in a photodetector unit.

As shown in FIG. 4 described later, the photodetector unit includes the first-fourth main photodetectors (18b–d, 19b–d, 20b–d, and 21b–d) for respectively receiving the first-fourth main returning lights, the first-fourth preceding photodetectors (18a, 19a, 20a, and 21a) for respectively receiving the first-fourth preceding returning lights, and the first-fourth succeeding photodetectors (18e, 19e, 20e, and 21e) for respectively receiving the first-fourth succeeding returning lights. Each main photodetector is divided into three photodetectors to employ a so-called SSD (Spot Size Detection) method for the detection of focus error signals. More specifically, the first main photodetector is divided into a photodetector 18c arranged at the center and photodetectors 18b and 18d arranged at both sides of the photodetector 18c.

The focus error calculation circuit 28 detects a focus error signal according to the SSD method. When doing so, the focus error calculation circuit 28 uses the received light signals obtained from the first-fourth main photodetectors.

This focus error signal detection is performed for any types of optical recording media regardless of their track densities and track shapes.

The differential push-pull circuit 29 detects a tracking error signal according to a so-called differential push-pull method. When doing so, the differential push-pull circuit 29 uses the received light signals obtained from the first-fourth main photodetectors, the first-fourth preceding photodetectors, and the first-fourth succeeding photodetectors. This tracking error signal detection according to the differential push-pull method is suitable for high-density optical recording media and write-once optical recording media.

The phase comparison calculation circuit 30 detects a tracking error signal according to a so-called differential phase detection method. When doing so, the phase comparison calculation circuit 30 uses received light signals obtained from the first-fourth main photodetectors. This tracking error signal detection according to the differential phase detection method is suitable for optical recording media having pits whose phase depths are each one-quarter ($\lambda/4$) of the wavelength of a laser beam.

The three-beam calculation circuit 31 detects a tracking error signal according to a so-called three-beam method. When doing so, the three-beam calculation circuit 31 uses received light signals obtained from the first-fourth preceding photodetectors and the first-fourth succeeding photodetectors.

This tracking error signal detection according to the three-beam method is suitable for optical recording media whose tracks are pit sequences or continuous grooves.

The judgement circuit 301 turns off the tracking servo circuit 303 when the optical recording medium 4 is placed in the optical reproduction apparatus. Then, under the condition where the optical recording medium 4 is rotating, the judgement circuit 301 obtains tracking error signals from the differential push-pull circuit 29, the phase comparison calculation circuit 30, and the three-beam calculation circuit 31. Finally, the judgement circuit 301 judges that a tracking error signal, whose amplitude level exceeds a threshold value, is an optimum signal, controls the selection circuit 302 to select the optimum tracking error signal, and turns on the tracking servo circuit 303.

As described above, the judgement circuit 301 finds an optimum tracking error signal using amplitude levels of tracking error signals obtained while the tracking servo is turned off and the optical recording medium is rotating. Because the tracking servo is turned off when these tracking error signals are detected, the spot of a laser beam travels back and forth across a plurality of tracks due to the eccentricity inherent in the optical recording medium and the eccentricity caused when the optical recording medium is placed. As a result, the tracking error signal detected using an appropriate method becomes a sine wave signal having an amplitude not below a predetermined level and the track error signal detected using an inappropriate method becomes a sine wave signal, which has an amplitude below a predetermined level, or a signal close to direct current.

The selection circuit 302 receives tracking error signals from the differential push-pull circuit 29, the phase comparison calculation circuit 30, and the three-beam calculation circuit 31, and selects one of the tracking error signals according to the judgement result of the judgement circuit 301.

The tracking servo circuit 303 drives a tracking servo using the tracking error signal selected by the selection circuit 302.

The focus servo circuit 304 drives a focus servo using the focus error signal obtained from the focus error calculation circuit 28.

As described above, the judgement circuit 301 determines the type of an optical recording medium according to the tracking error signals obtained from the differential push-pull circuit 29, the phase comparison calculation circuit 30, and the three-beam calculation circuit 31. The selection circuit 302 selects an optimum tracking error signal according to the judgement result of the judgement circuit 301. In this manner, the optical reproduction apparatus of the present embodiment supports various types of optical recording media.

The present optical reproduction apparatus reproduces information on the optical recording medium 4 or records information onto the optical recording medium 4 by driving the tracking servo and focus servo in the manner described above.

When information on the optical recording medium 4 is reproduced, signals from the photodetector unit in the optical pickup 1 are processed by the information signal detection circuit 309 and are outputted as reproduction signals. When information is recorded onto the optical recording medium 4, information inputted from the outside is converted into a signal, whose format is suitable for the optical recording medium 4, by the signal processing circuit 310 and is sent to the laser control unit 308. Then, according to the signal generated by the signal processing circuit 310, the laser control unit 308 drives the semiconductor laser component in the optical pickup 1 to record the information onto the optical recording medium 4. During recording, the laser control unit 308 sets the optical power of the semiconductor laser component to become higher than that during reproduction.

It should be noted here that as described later, the optical pickup 1 includes two semiconductor laser elements having different wavelengths. According to an instruction from the judgement circuit 301, the laser control unit 308 selects and drives a semiconductor laser whose wavelength is appropriate to the type of the current optical recording medium.

<Construction of Optical Pickup>

Figure 2:
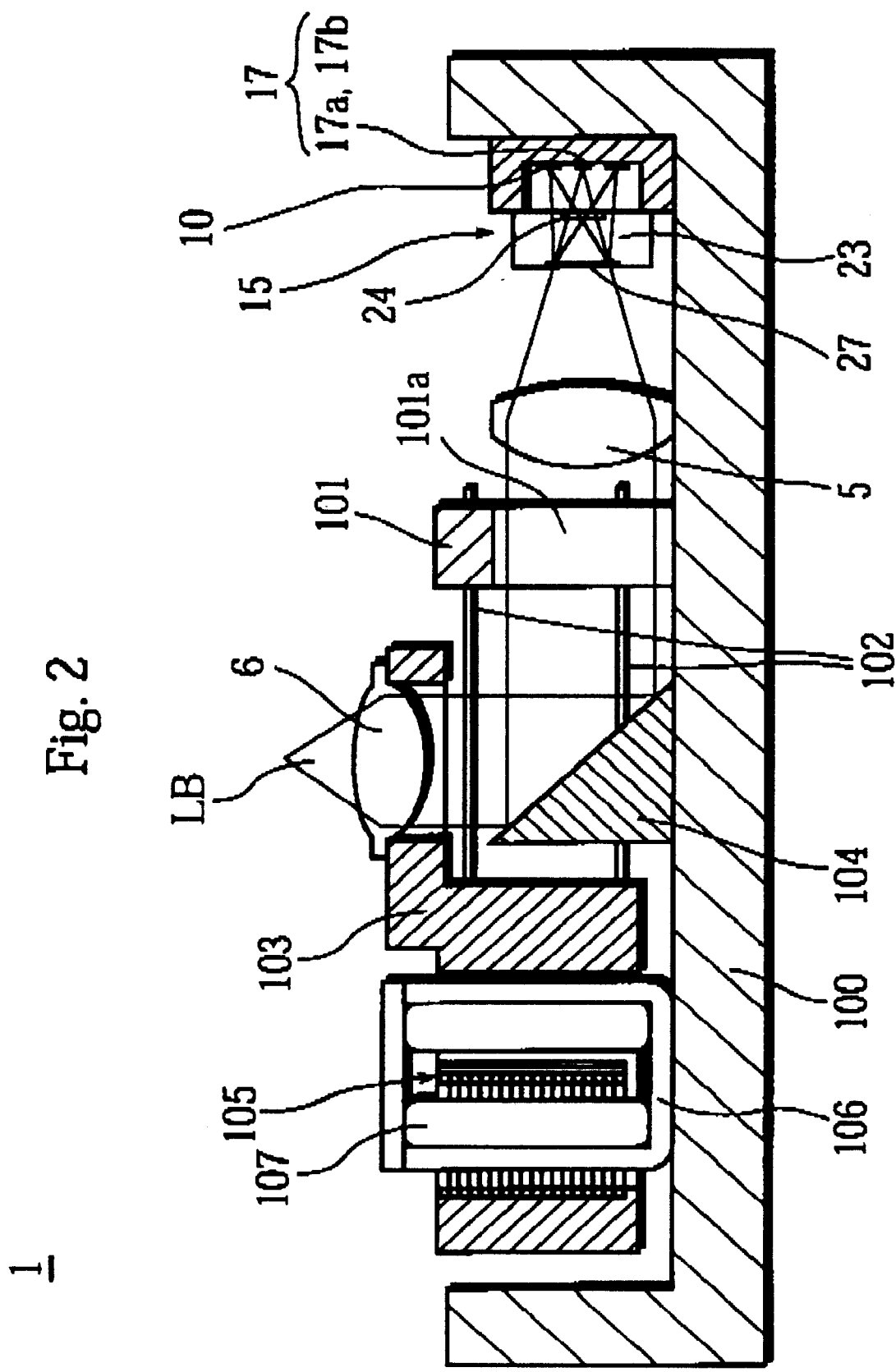
FIG. 2 is a longitudinal sectional view of an optical pickup of the optical recording and reproduction apparatus.

FIG. 2 is a longitudinal sectional view of the optical pickup 1 described above. As shown in this drawing, the optical pickup 1 has a construction where a photodetector device 15, a fixing member 101, a collimator lens 5, a mirror 104, and a yoke 106 are mounted on an optical base 100, and a movable member 103, on which an objective lens 6 is mounted, is supported by the fixing member 101 using a plurality of supporting members 102. In this embodiment, four supporting members, which are each an elastic metal wire, are used. Because FIG. 2 is a sectional view, only two supporting members arranged backward are shown in this drawing. This construction allows the objective lens 6 to be displaced in a direction parallel to the optical axis of the objective lens 6 (in a focusing direction) and in a direction perpendicular to the optical axes of the collimator lens 5 and the objective lens 6 (in a tracking direction).

A coil unit 105 includes a tracking coil and a focusing coil. The Lorentz power is generated by passing a current through the coil unit 105 in a magnetic field formed by a pair of magnets 107 supported by the yoke 106. The movable member 103 is displaced by the Lorentz power in the focusing direction or the tracking direction.

The photodetector device 15 includes a hologram optical component 23, two semiconductor laser elements 17a and 17b, and a photodetector unit 10 that includes a plurality of photodetectors. The laser beam LB emitted from the semiconductor laser element 17a or the semiconductor laser element 17b is converted into parallel rays by the collimator lens 5, strikes the mirror 104 through a clip 101a formed at approximately the center of the fixing member 101, is reflected by the mirror 104 to travel upward, and is converged by the objective lens 6 to form a spot on the recording surface of the optical recording medium 4. The returning lights reflected by the recording surface travel the optical path described above in the reverse direction and are detected by the photodetector unit 10 of the photodetector device 15.

The tracking error signals and focus error signal described above are generated from the signals detected by the photodetector unit 10. The tracking servo circuit 303 and the focus servo circuit 304 generate servo signals from the tracking error signals and focus error signal and the coil unit 105 is driven according to the servo signals. In this manner, the objective lens 6 is located in an appropriate position and the laser beam LB traces the information recording sequences of the optical recording medium 4 with accuracy.

It should be noted here that in this embodiment, the supporting members 102 double as feeding paths to the tracking coil and focusing coil of the coil unit 105. This saves the need to additionally connect leads to the movable member 103 and to route the leads to the outside. As a result, the movable member 103 moves smoothly and the information recording sequences of the optical recording media 4 are traced with high accuracy.

<Construction of Optical system>

Figure 3:
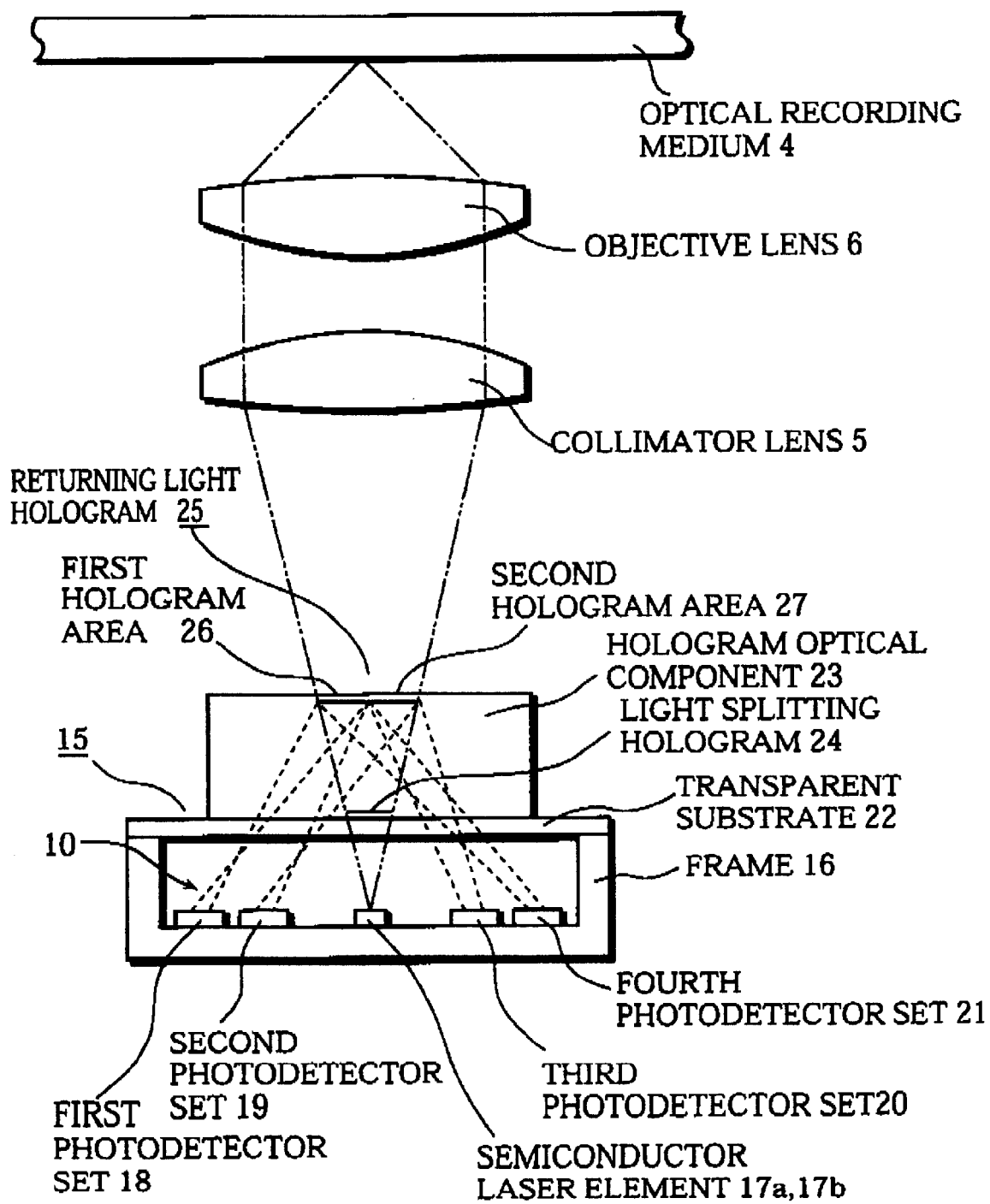
FIG. 3 is a longitudinal sectional view of the optical system of the optical pickup, where the main construction elements of the optical system are shown.

FIG. 3 is a longitudinal sectional view of the optical system of the optical pickup 1. For ease of explanation, this drawing shows only the main construction elements of the optical system and omits, for instance, the mirror 104 shown in FIG. 2.

The objective lens 6 is, for instance, a two-focus lens compatible with CDs and DVDs. In this embodiment, a hologram area, which splits each returning light into the zeroth-order diffraction light and the first-order diffraction light, is provided at the center of the objective lens 6. Therefore, the objective lens 6 has different focal lengths and numerical apertures for the zeroth-order diffraction light (transmitted light) and the first-order diffraction light.

The photodetector device 15 includes a frame 16, a semiconductor component 17 including semiconductor laser elements 17a and 17b arranged at the bottom of the frame 16, a photodetector unit 10 including four photodetector sets 18–21 that are arranged at the bottom of the frame 16 and on the both sides of the semiconductor laser component 17, a transparent substrate 22 that is arranged to cover the frame 16 and is made of a transparent material, such as a glass or a resin, and a hologram optical component 23 placed on the transparent substrate 22.

The semiconductor laser element 17a emits red laser light (whose wavelength is about 650 nm) and the semiconductor laser element 17b emits infrared laser light (whose wavelength is about 800 nm). One of the semiconductor laser elements 17a and 17b is selected according to the track shape, track density, and type of the optical recording medium 4. By selectively using these semiconductor laser elements having different wavelengths, two types of tracking error signals are detected for each tracking error signal detection method. As a result, the number of types of optical recording media supported by the present optical reproduction apparatus is increased. This aspect will be described in detail later.

The hologram optical component 23 is disposed in the optical path of outgoing light from the semiconductor laser component 17, and includes a light splitting hologram 24 arranged on the surface of the hologram optical component 23 facing the semiconductor laser component 17 and a returning light hologram 25 arranged on the opposite surface of the component 23.

The light splitting hologram 24 splits the light beam emitted from the semiconductor laser component 17 into a main beam, a preceding sub-beam, and a succeeding sub-beam. These beams are incident on the optical recording medium 4 through the collimator lens 5 and the objective lens 6, are reflected by the optical recording medium 4, and travel to the returning light hologram 25.

The returning light hologram 25 splits each returning light reflected by the optical recording medium 4 into the left half of a positive first-order diffraction light, the left half of a negative first-order diffraction light, the right half of the positive first-order diffraction light, and the right half of the negative first-order diffraction light.

Here, the principal ray of the outgoing light from the semiconductor laser component 17 matches the optical axes of the collimator lens 5 and the objective lens 6. In FIG. 3, the light beam emitted from the semiconductor laser component 17 is shown using chain lines and returning lights are shown using dashed lines. The light beam emitted from the semiconductor laser component 17 is divided by the hologram optical component 23 into a main beam, a preceding sub-beam, and a succeeding sub-beam. Each of the main returning light, preceding returning light, and succeeding returning light reflected by the optical recording medium 4 is divided by the hologram optical component 23 into the left half of a positive first-order diffraction light, the left half of a negative first-order diffraction light, the right half of the positive first-order diffraction light, and the right half of the negative first-order diffraction light.

<Photodetector Unit>

The photodetector unit 10, which includes the semiconductor laser component 17 and four photodetector sets 18–21, is provided at the bottom of the frame 16. FIG. 4 is a plain view of the photodetector unit 10 when viewed from above.

As shown in this drawing, when viewed from the light emitting side of the semiconductor laser component 17, the photodetector set 18, the photodetector set 19, the semiconductor laser component 17, the photodetector set 20, and the photodetector set 21 are arranged in this order from the left of the photodetector unit 10.

Each of the photodetector sets 18–21 includes three photodetectors that have substantially the same size and are arranged perpendicular to the arrangement direction of the photodetector sets. Note that the photodetector at the center of each photodetector set is divided into three photodetectors arranged perpendicular to the arrangement direction of the photodetector sets. The photodetectors of the photodetector set 18 are given reference signs 18a, 18b, 18c, 18d, and 18e from the top. This is the same to the photodetector sets 19–21.

The photodetectors 18a–21a are the first-fourth preceding photodetectors described above and receive the preceding returning light from the optical recording medium.

The photodetectors 18a–21a respectively receive the left half of a positive first-order diffraction light, the right half of the positive first-order diffraction light, the right half of the negative first-order diffraction light, and the left half of a negative first-order diffraction light of the preceding returning light. Also, the photodetectors 18b–18d, 19b–19d, 20b–20d, and 21b–21d are the first-fourth main photodetectors described above and respectively receive the left half of a positive first-order diffraction light, the right half of the positive first-order diffraction light, the right half of the negative first-order diffraction light, and the left half of a negative first-order diffraction light of the main returning light. Further, the photodetectors 18e–21e are respectively the first-fourth succeeding photodetectors described above and respectively receive the left half of a positive first-order diffraction light, the right half of the positive first-order diffraction light, the right half of the negative first-order diffraction light, and the left half of a negative first-order diffraction light of the succeeding returning light.

With the stated number and arrangement of the photodetectors, the photodetector unit 10 can detect at least three types of tracking error signals as well as a focus error signal by appropriately combining signals from the photodetectors. More specifically, as described using FIG. 1, the number and arrangement of the photodetectors of the photodetector unit 10 is suitable for detecting a focus error signal according to the SSD method and for detecting three types of tracking error signals according to the differential push-pull method, differential phase detection method, and three-beam method. Therefore, the present optical reproduction apparatus equipped with this photodetector unit can selectively use the three types of tracking error signals. As a result, this optical reproduction apparatus can easily support various types of optical recording media having different physical formats (such as different track shapes and different track pitches).

As described above, in the photodetector unit 10, the semiconductor laser component 17, which includes the semiconductor elements 17a and 17b and emits a laser beam approximately perpendicular to the arrangement plane of the construction elements of the photodetector unit 10, is provided at the center of the arrangement of the photodetectors. Therefore, the principal ray of the outgoing light to the optical recording medium approximately matches that of the returning light from the optical recording medium. As a result, a small optical pickup is achieved with this photodetector unit 10.

<Hologram Optical Component 23>

Figure 6:
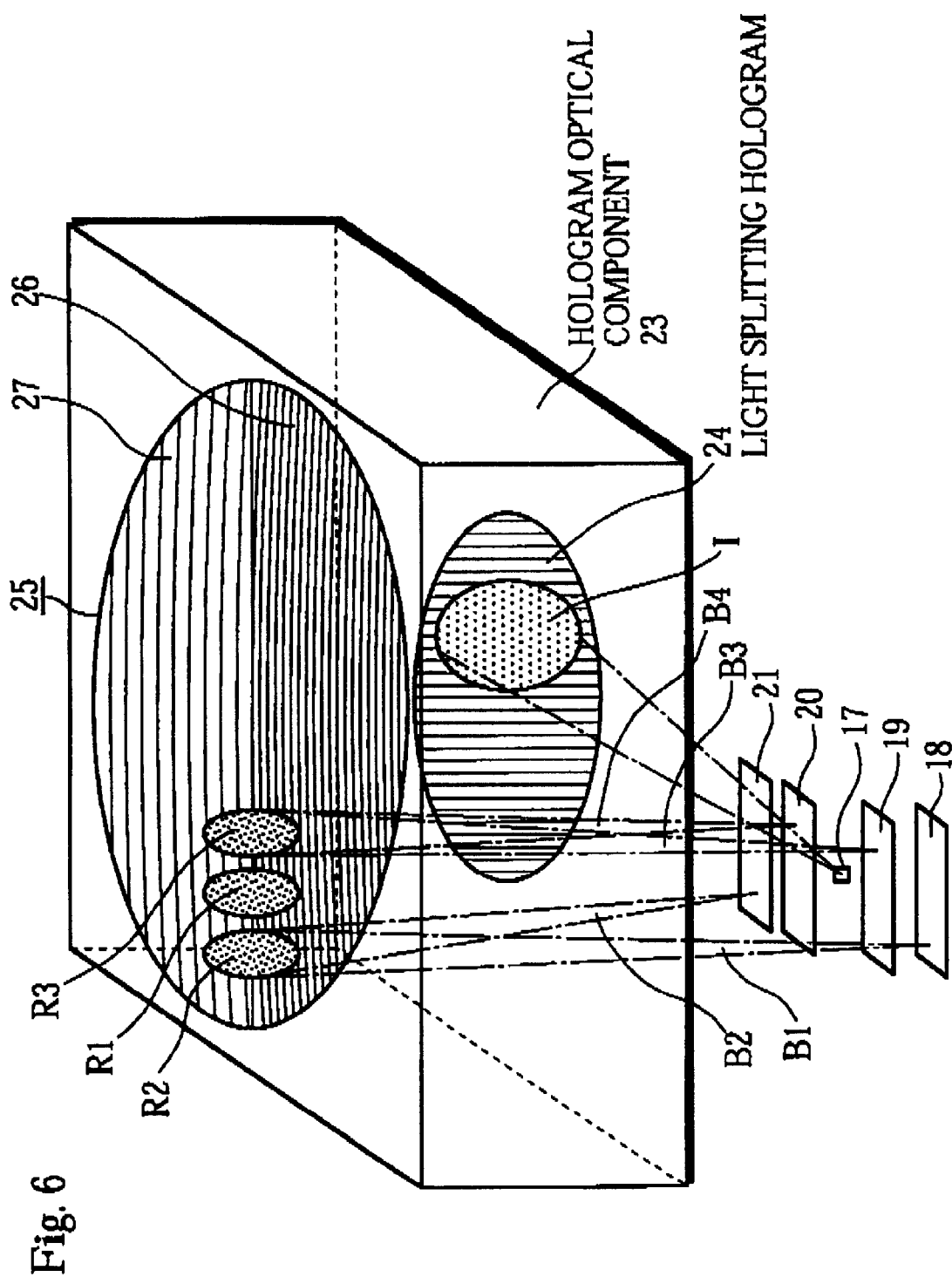
FIG. 6 illustrates a situation where light beams are incident on a light splitting hologram and the returning light hologram.

FIG. 6 illustrates a situation where a light beam emitted from the semiconductor laser component 17 is incident on the light splitting hologram 24, the returning lights reflected by the optical recording medium 4 strike the returning light hologram 25, and the returning light hologram 25 diffracts the returning lights and directs the diffraction lights toward the photodetector sets 18, 19, 20, and 21.

The light splitting hologram 24 is a diffraction grating that generates three beams. More specifically, the light splitting hologram 24 splits a light beam emitted from the semiconductor laser component 17 into three beams and gathers these beams onto the optical recording medium 4 to form spots between which there is an interval of an odd multiple of approximately one-half of the pitch size of the information recording sequences of the optical recording medium 4. In FIG. 6, for convenience in illustrating, a modest-sized spot is shown in an area, which is slightly shifted rightward, of the light splitting hologram 24. In reality, however, the spot having a diameter larger than the radius of the light splitting hologram 24 is formed on the center of the light splitting hologram 24.

Figure 5:
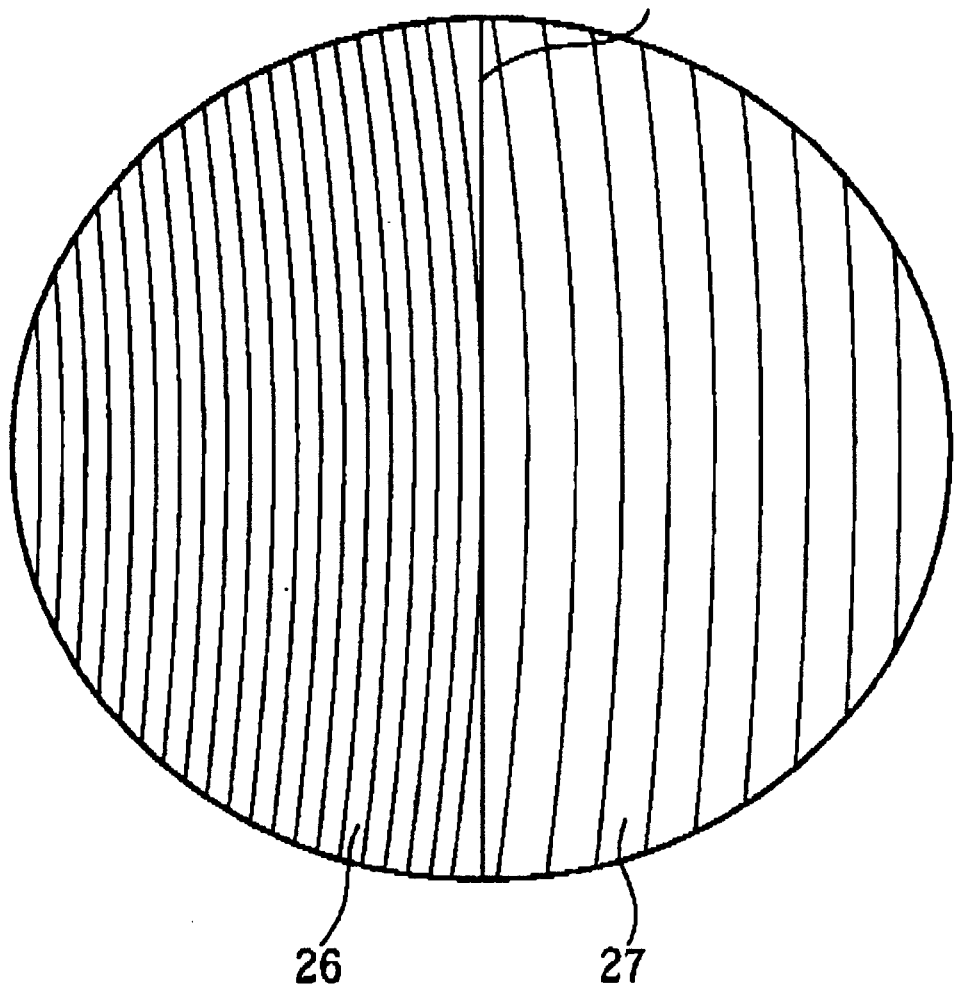
FIG. 5 shows the construction of a returning light hologram.

The returning light hologram 25 is divided into two hologram areas 26 and 27 by a division line, as shown in FIG. 5. The division line extends along a direction of tracks on the optical recording medium 4, that is, perpendicular to the radius direction of the optical recording medium 4. These hologram areas 26 and 27 respectively diffract the left half and right half of each returning light from the optical recording medium 4 and direct the diffraction lights toward the photodetectors.

Each of the hologram areas 26 and 27 includes a diffraction grating, and the diffraction grooves of the hologram area 26 are approximately parallel to those of the hologram area 27. The pitch of the diffraction grating in the hologram area 26 is set to be less than that in the hologram area 27 to obtain different diffraction angles. That is, the hologram area 26 having a less diffraction grating pitch has a greater diffraction angle than the hologram area 27. As a result, the positive and negative first-order diffraction lights from the hologram area 26 are respectively received by the photodetector sets 18 and 21 arranged outward, and the positive and negative first-order diffraction lights from the hologram area 27 are respectively received by the photodetector sets 19 and 20 arranged inward.

Because the diffraction grating in each of the hologram areas 26 and 27 has a curvature, as shown in FIG. 5, each of these areas 26 and 27 perform a wavefront conversion function (a lens effect). As a result, the positive and negative first-order diffraction lights in each of the hologram areas 26 and 27 have different focal lengths. As shown by the dashed lines in FIG. 3, the focal length of the positive first-order diffraction light is shorter than that of the negative first-order diffraction light. The different focal lengths of the positive and negative first-order diffraction lights allow the SSD method to be used to detect focus error signals.

There is no specific relation between (1) the pitch between and the number of diffraction grooves of the light splitting hologram 24 and (2) those of the returning light hologram 25. In this embodiment, however, the light splitting hologram 24 and the returning light hologram 25 are arranged so that the arrangement direction of the diffraction grooves of the light splitting hologram 24 is perpendicular to that of the returning light hologram 25 and approximately parallel to the direction of the major axis of the far-field pattern of the light beam emitted from the semiconductor laser element 17a or 17b.

In FIG. 6, circles R1, R2, and R3 respectively represent the spots of the main returning light, preceding returning light, and succeeding returning light. Each of the main, preceding, and succeeding returning lights is incident on the returning light hologram 25, is diffracted therein, and strikes the first-fourth photodetector sets 18–21. Also, B1 and B2 shown using chain lines represent the positive and negative first-order diffraction lights of the left half (the lower half in FIG. 6) of the preceding returning light. Further, B3 and B4 represent the positive and negative first-order diffraction lights of the right half (the upper half in FIG. 6) of the succeeding returning light. Other diffraction lights are omitted in FIG. 6.

Among diffraction lights of the preceding returning light from the first hologram area 26, for instance, the positive first-order diffraction light B1 strikes the photodetector set 18 and the negative first-order diffraction light B2 strikes the photodetector set 21. Also, among diffraction lights of the succeeding returning light from the second hologram area 27, the positive first-order diffraction light B3 strikes the photodetector set 19 and the negative first-order diffraction light B4 strikes the photodetector set 20. Although the spots of the main, preceding, and succeeding returning lights are shown using modest-sized circles R1–R3 in FIG. 6, the actual size of each spot exceeds one-third of the area of the returning light hologram 25. Also, each spot is formed to be symmetric with respect to the division line of the returning light hologram 25.

Because the optical pickup 1 has the construction described above, it becomes unnecessary to adjust, in the order of 1 $\mu$m, the positions of the construction elements of the optical pickup 1 to bring returning lights into focus on the photodetectors. That is, it is enough to bring the returning lights to strike the respective areas of the returning light hologram 25. This results in the high adjustment tolerance of several ten $\mu$m. Also, in the optical pickup 1, a plurality of photodetectors are arranged on both sides of the semiconductor laser component 17 to receive both of the positive and negative first-order diffraction lights from the returning light hologram 25. As a result, light is used with high efficiency in comparison with a conventional component where semiconductor laser elements and photodetectors are combined. Further, the optical pickup 1 is capable of generating a focus error signal according to the SSD method and a plurality of types of tracking error signals according to the differential push-pull method, differential phase detection method, and three-beam method. Also, because various components are integrated into one piece in the optical pickup 1, this optical pickup can be miniaturized and mass-produced without difficulty.

<Construction of Circuit System>

Figure 7:
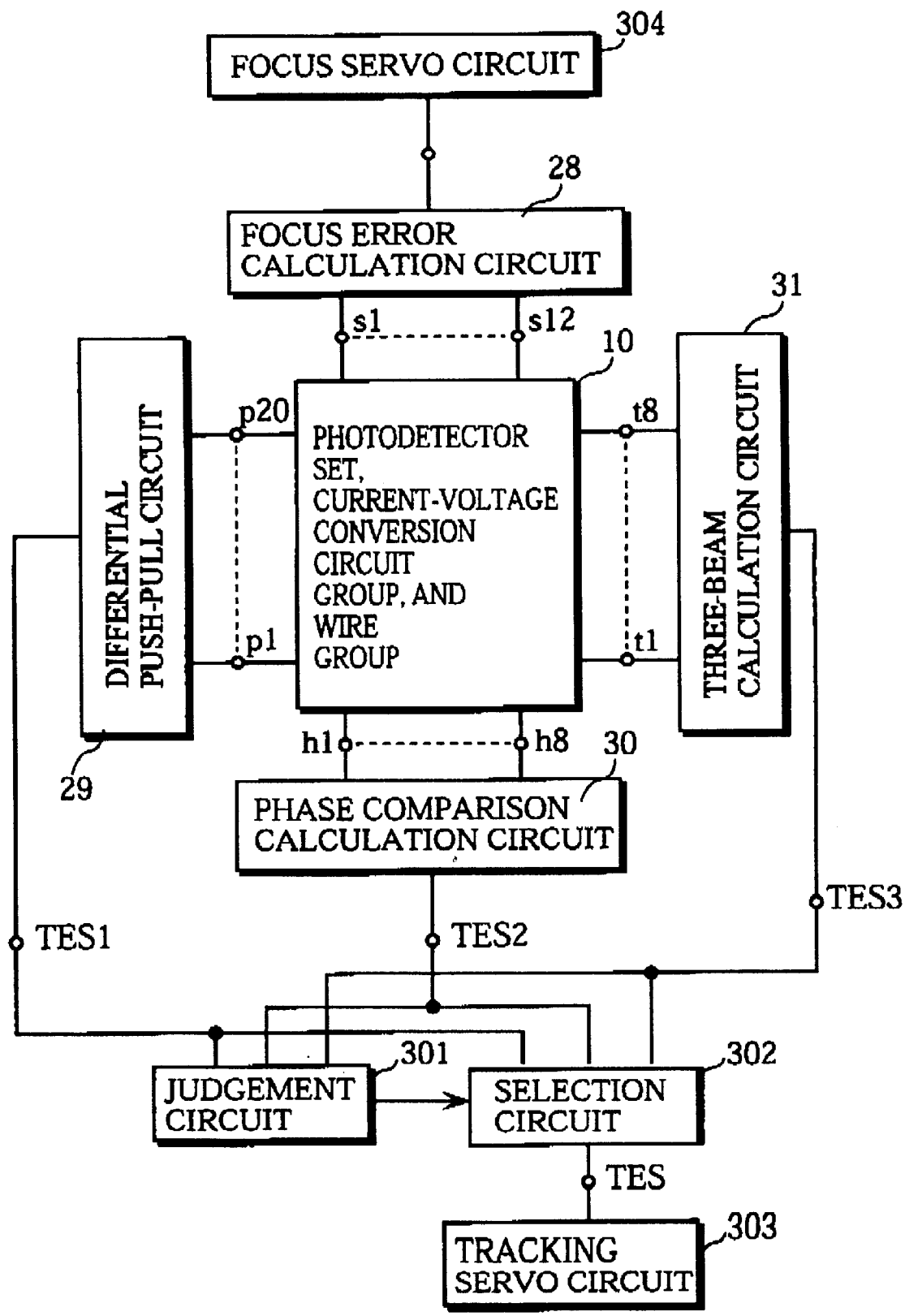
FIG. 7 shows the connection relation between a circuit system and the photodetector unit in the optical pickup.

FIG. 7 shows the connection relation between the circuit system shown in FIG. 1 and the photodetector unit 10 in the optical pickup 1.

As shown in this drawing, the photodetector unit 10 includes a current-voltage conversion circuit group and a wire group. The current-voltage conversion circuit group converts a current value, which represents the received light amount obtained from each photodetector, into a voltage value. The wire group transmits received light signals, which are obtained from the current-voltage conversion circuit group, to the focus error calculation circuit 28, the differential push-pull circuit 29, the phase comparison calculation circuit 30, and the three-beam calculation circuit 31. In this drawing, terminal groups s1–s12, p1–p20, h1–h8, and t1–t8 are respectively connected to the focus error calculation circuit 28, the differential push-pull circuit 29, the phase comparison calculation circuit 30, and the three-beam calculation circuit 31.

Figure 8:
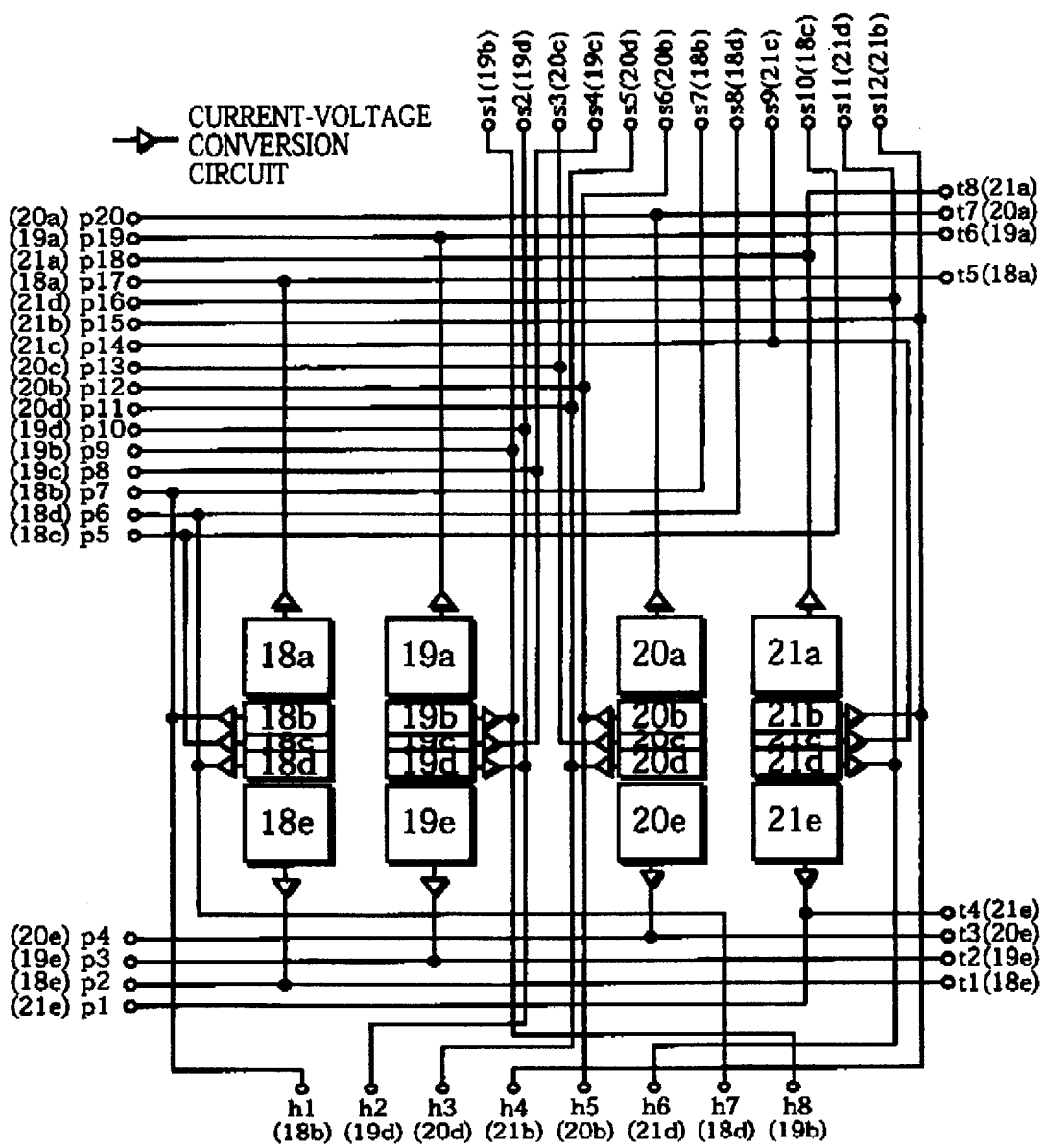
FIG. 8 shows an example wiring state where current-voltage conversion circuits, the photodetectors, and wires are connected to each other.

FIG. 8 shows an example wiring state where the current-voltage conversion circuits, the photodetectors, and the wires are connected to each other. In this drawing, each terminal is given a terminal name accompanied with the reference sign of a photodetector that outputs a received light signal to the terminal.

The output signal from each photodetector is a current value representing a received light amount and is outputted to a corresponding current-voltage conversion circuit. Each current-voltage conversion circuit receives an output signal from a corresponding photodetector and outputs a received light signal that represents the received light amount using a voltage value. With the connections shown in FIG. 8, the received light signal from each current-voltage conversion circuit is outputted to at least one terminal.

<Focus Error Calculation Circuit 28>

Figure 9:
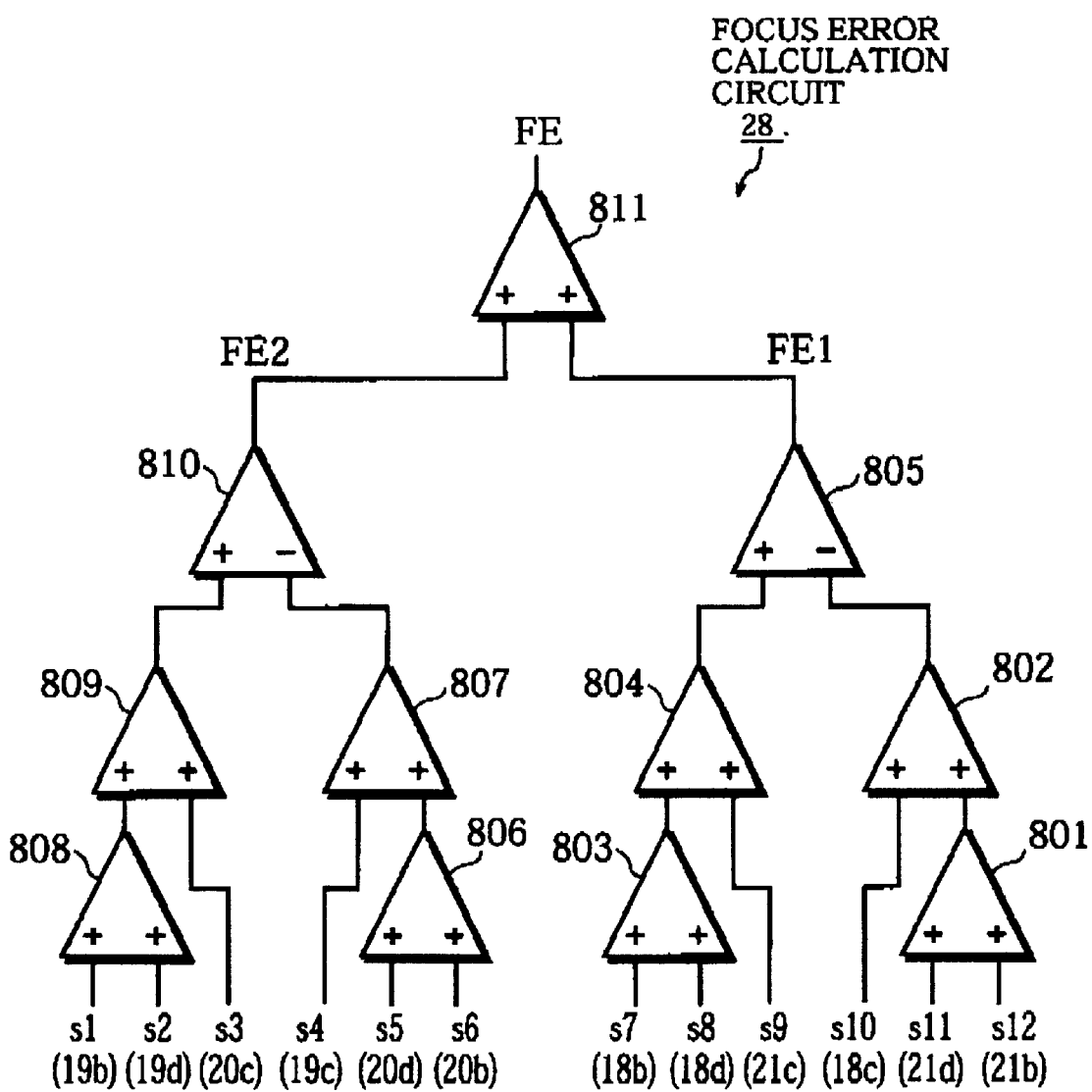
FIG. 9 shows an example construction of a focus error calculation circuit.

FIG. 9 shows an example construction of the focus error calculation circuit 28. As shown in this drawing, the focus error calculation circuit 28 includes adders 801–804, 806–809, and 811, and subtracters 805 and 810.

The input terminals of the adders 801–804 are connected to the terminals s7–s12 shown in FIG. 8 and are applied with the received light signals obtained from the photodetectors 18b, 18c, 18d, 21b, 21c, and 21d. These photodetectors receive the left half of the main returning light, that is, the positive and negative first-order diffraction lights from the hologram area 26. Note that the voltage value of a received light signal obtained from a photodetector ix (where i∈18, 19, 20, 21 and x∈a, b, c, d, e) is hereinafter referred to as Sgi*x*. For instance, the received light signal obtained from the photodetector 18*b* or a corresponding current-voltage conversion circuit is hereinafter referred to as Sg18*b*.

The adders 801–804 and the subtracter 805 calculate the first SSD signal FE1 according to Formula 1 given below.

$$FE1=(Sg18b+Sg18d+Sg21c)-(Sg18c+Sg21b+Sg21d) \quad \text{(Formula 1)}$$

Similarly, the input terminals of the adders 806–809 are connected to the terminals s1–s6 shown in FIG. 8 and are applied with the received light signals obtained from the photodetectors 19*b*, 19*c*, 19*d*, 20*b*, 20*c*, and 20*d*. These photodetectors receive the right half of the main returning light, that is, the positive and negative first-order diffraction lights from the hologram area 27.

The adders 806–809 and the subtracter 810 calculate the second SSD signal FE2 according to Formula 2 given below.

$$FE2=(Sg19b+Sg19d+Sg20c)-(Sg19c+Sg20b+Sg20d) \quad \text{(Formula 2)}$$

The adder 811 adds the first SSD signal FE1 to the second SSD signal FE2 according to Formula 3 given below and outputs an addition result as a signal representing a focus error.

$$FE=FE1+FE2 \quad \text{(Calculation 3)}$$

This signal FE is a focus error signal obtained with the SSD method.

<Differential Push-Pull Circuit 29>

Figure 10:
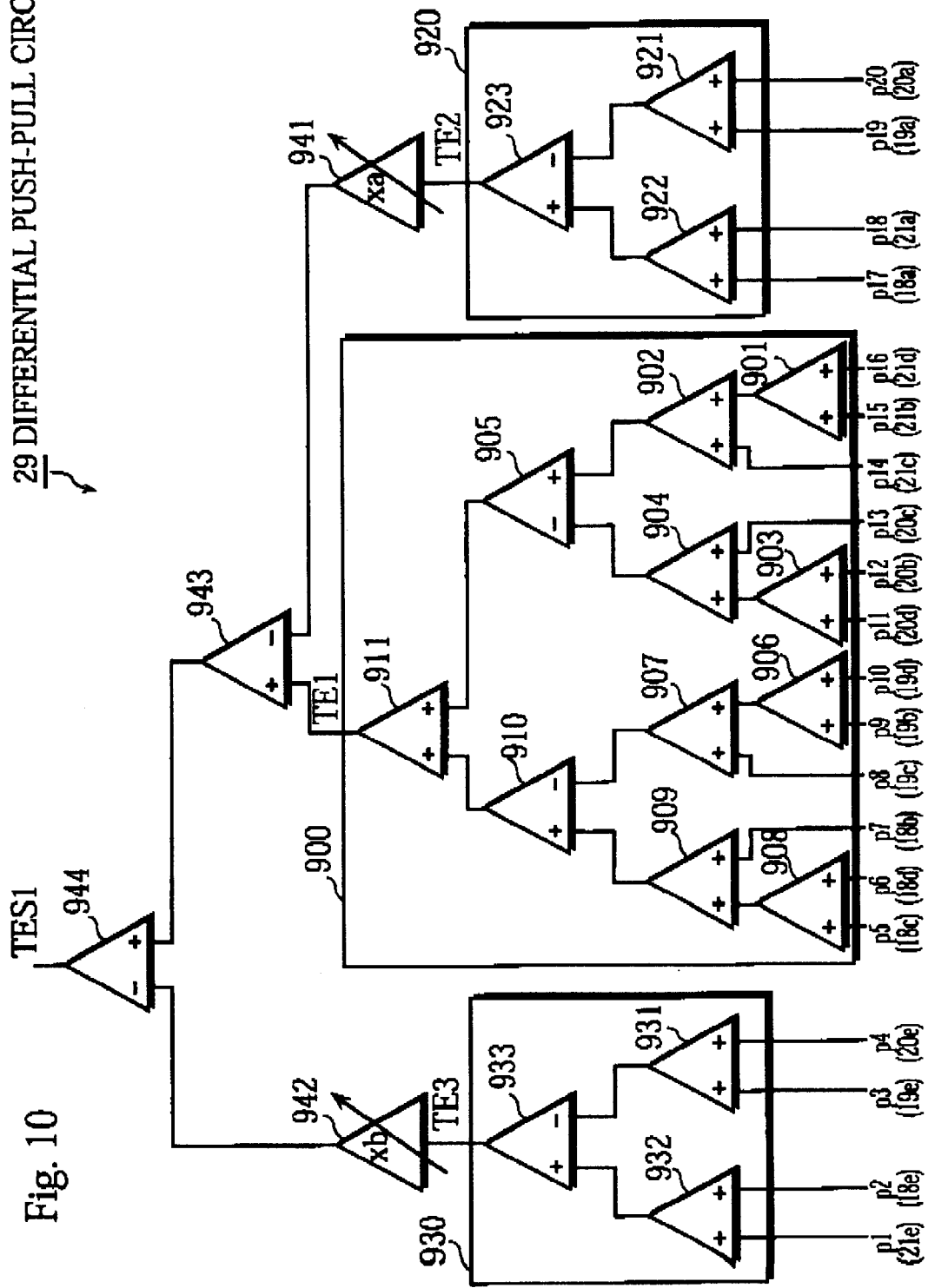
FIG. 10 shows an example construction of a differential push-pull circuit.

FIG. 10 shows an example construction of the differential push-pull circuit 29. As shown in this drawing, the differential push-pull circuit 29 includes the first push-pull signal detection unit 900, the second push-pull signal detection unit 920, the third push-pull signal detection unit 930, multipliers 941 and 942, and subtracters 943 and 944. The first push-pull signal detection unit 900 includes adders 901–904, 906–909, and 911, and subtracters 905 and 910. The second push-pull signal detection unit 920 includes adders 921 and 922 and a subtracter 923. The third push-pull signal detection unit 930 includes adders 931 and 932 and a subtracter 933.

The first push-pull signal detection unit 900 calculates the first push-pull signal TE1 according to Formula 4 given below. The first push-pull signal TE1 represents the difference between the left half and the right half of the main returning 1light, that is, the difference between the main returning light from the hologram area 26 (the received light signals from the photodetectors 18*b*–18*d* and 21*b*–21*d*) and the main returning light from the hologram area 27 (the received light signals from the photodetectors 19*b*–19*d* and 20*b*–20*d*).

$$TE1=(Sg18b+Sg18c+Sg18d+Sg21b+Sg21c+Sg21d) \quad \text{(Formula 4)}$$

The second push-pull signal detection unit 920 calculates the second push-pull signal TE2 according to Formula 5 given below. The second push-pull signal TE2 represents the difference between the left half and the right half of the preceding returning light, that is, the difference between the preceding returning light from the hologram area 26 (the received light signals from the photodetectors 18*a* and 21*a*) and the preceding returning light from the hologram area 27 (the received light signals from the photodetectors 19*a* and 20*a*).

$$TE2=(Sg18a+Sg21a)-(Sg19a+Sg20a) \quad \text{(Formula 5)}$$

The third push-pull signal detection unit 930 calculates the third push-pull signal TE3 according to Formula 6 given below. The third push-pull signal TE3 represents the difference between the left half and the right half of the succeeding returning light, that is, the difference between the succeeding returning light from the hologram area 26 (the received light signals from the photodetectors 18*e* and 21*e*) and the succeeding returning light from the hologram area 27 (the received light signals from the photodetectors 19*e* and 20*e*).

$$TE3=(Sg18e+Sg21e)-(Sg19e+Sg20e) \quad \text{(Formula 6)}$$

The multipliers 941 and 942 and the subtracters 943 and 944 calculate the first tracking error signal TES1 from the first-third push-pull signals according to Formula 7 given below.

$$TES1=TE1-(aTE2+bTE3) \quad \text{(Formula 7)}$$

In this formula, a and b respectively refer to constants given to the multipliers 941 and 942. These constants are compensation coefficients used to correct the first push-pull signal TE1, which is obtained from the main returning light, using the second and third push-pull signals, which are obtained from the preceding and succeeding returning lights.

The first tracking error signal TES1 obtained by the differential push-pull circuit 29 is hereinafter referred to as DPP_TES1.

<Phase Comparison Calculation Circuit 30>

Figure 11:
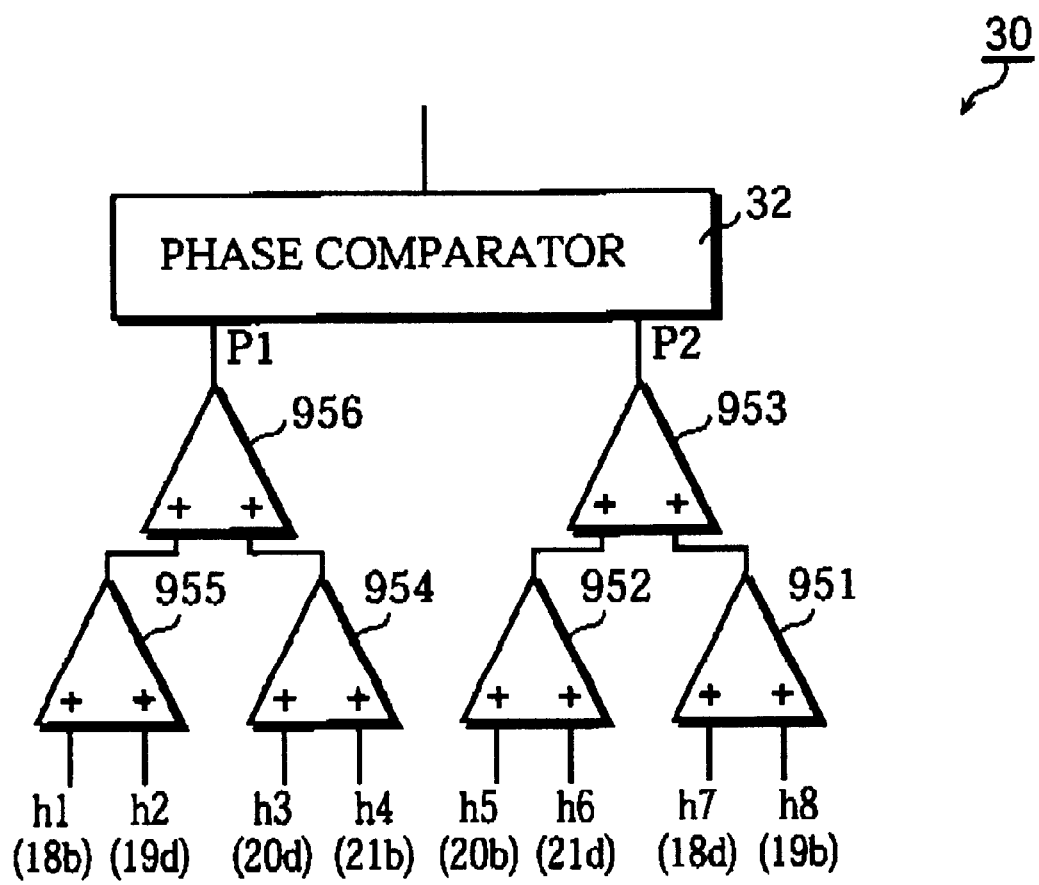
FIG. 11 shows an example construction of a phase comparison calculation circuit.

FIG. 11 shows an example construction of the phase comparison calculation circuit 30. As shown in this drawing, the phase comparison calculation circuit 30 includes adders 951–956 and a phase comparator 32.

The adders 954–956 calculate an output signal P1 according to Formula 8 given below. The output signal P1 represents the total received light amount in two spot areas of a main beam. Here, the main beam is divided into four spot areas (the upper right area, upper left area, lower right area, and lower left area) and the two spot areas are diagonally opposed.

$$P1=Sg18b+Sg19d+Sg20d+Sg21b \quad \text{(Formula 8)}$$

The adders 951–953 calculate an output signal P2 according to Formula 9 given below. The output signal P2 represents the total received light amount in remaining two spot areas of the main beam.

$$P2=Sg18d+Sg19b+Sg20b+Sg21d \quad \text{(Formula 9)}$$

The phase comparator 32 detects the phase difference between the output signals P1 and P2 and outputs the detected phase different as the second tracking error signal TES2. For instance, the detected phase difference represents how far advanced the phase of P2 is with respect to P1. The second tracking error signal obtained by the phase comparison calculation circuit 30 is hereinafter referred to as PH_TES2.

<Three-Beam Calculation Circuit 31>

Figure 12:
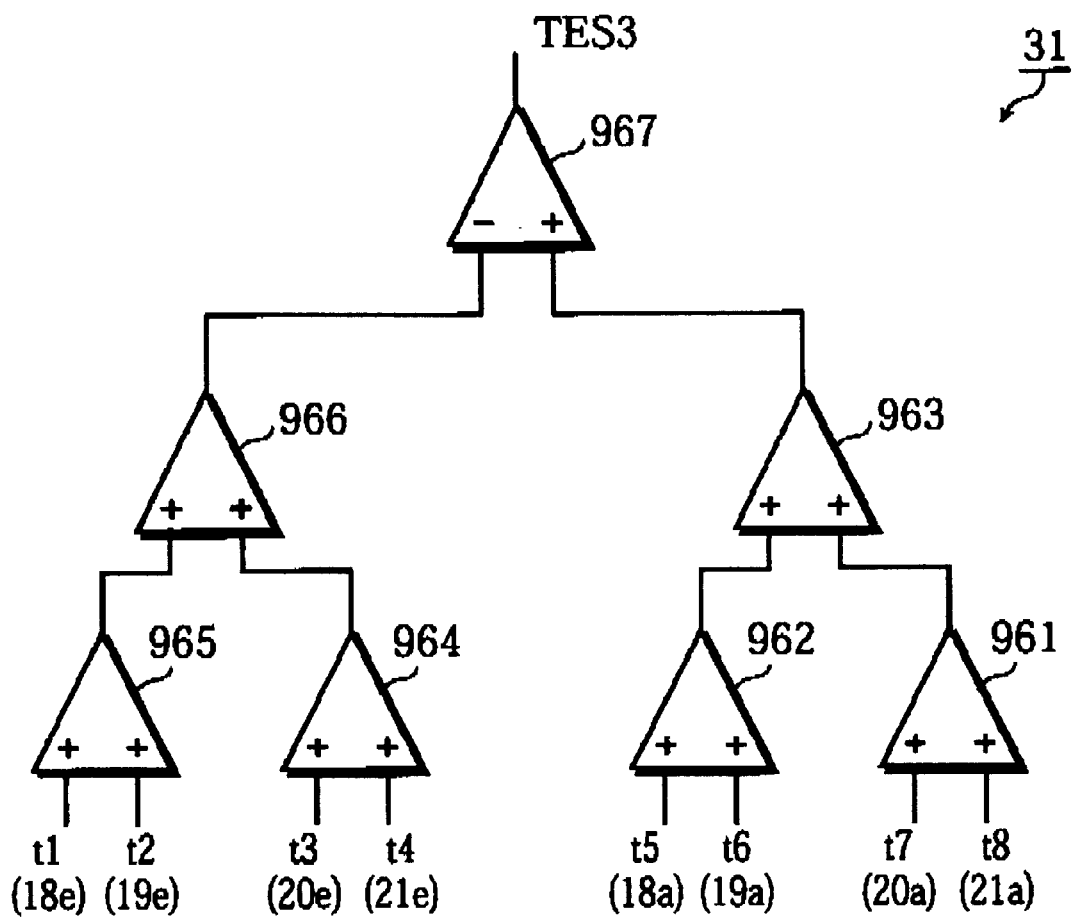
FIG. 12 shows an example construction of a three-beam calculation circuit.

FIG. 12 shows an example construction of the three-beam calculation circuit 31. As shown in this drawing, the three-beam calculation circuit 31 includes adders 961–966 and a subtracter 967. With this construction, the three-beam calculation circuit 31 calculates a difference between the received light amount of a preceding returning light and that of a succeeding returning light according to Formula 10 given below and outputs the difference as the third tracking error signal TES3.

$$TES3=(Sg18a+Sg19a+Sg20a+Sg21a)-(Sg18e+Sg19e+Sg20e+Sg21e) \quad \text{(Formula 10)}$$

The third tracking error signal obtained by the three-beam calculation circuit 31 is hereinafter referred to as 3B_TES3.

<Judgement Circuit 301>

Figure 13A:
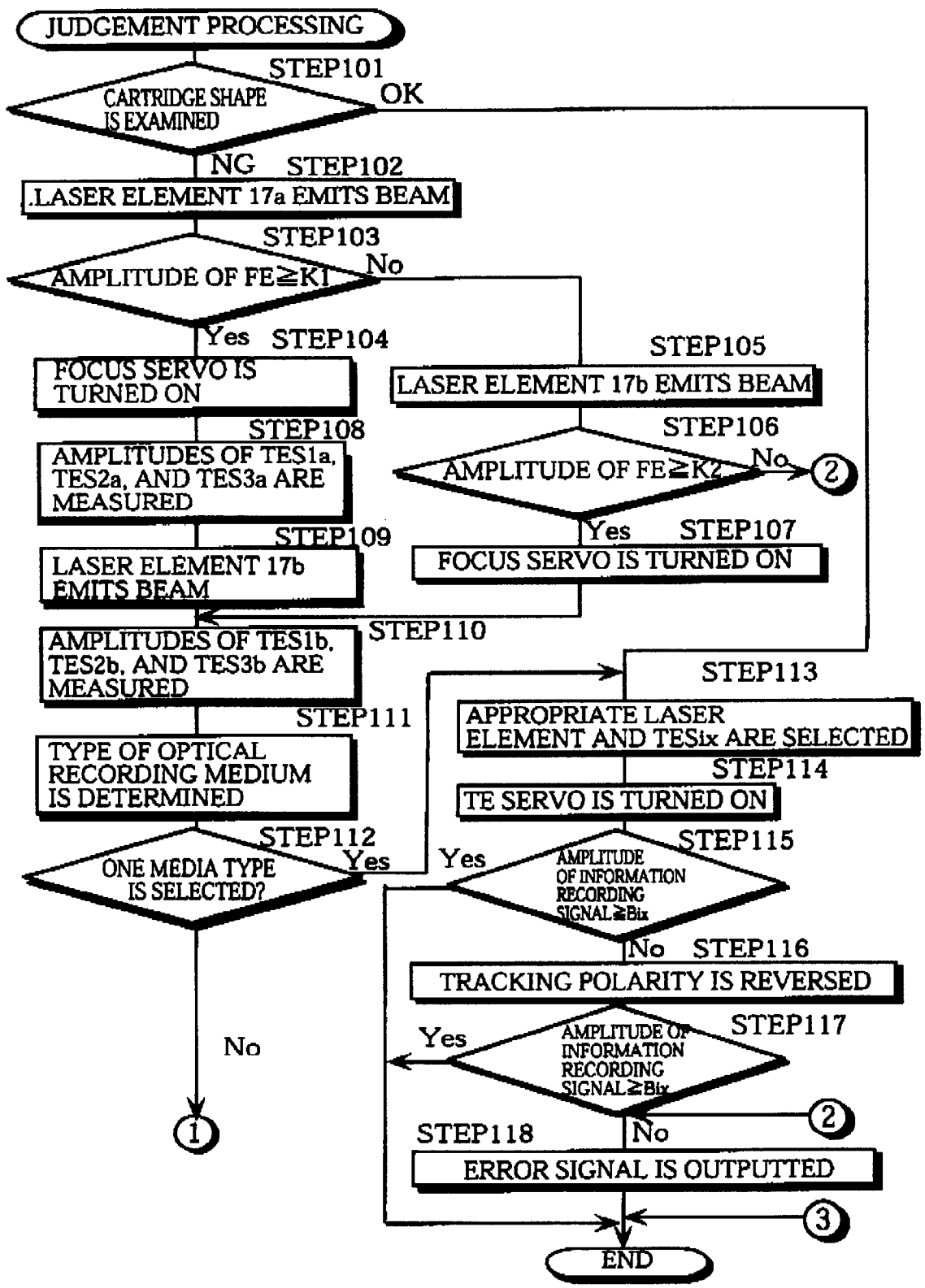
FIGS. 13A and 13B are flow charts showing the judgement processing of a judgement circuit in detail.
Figure 13B:
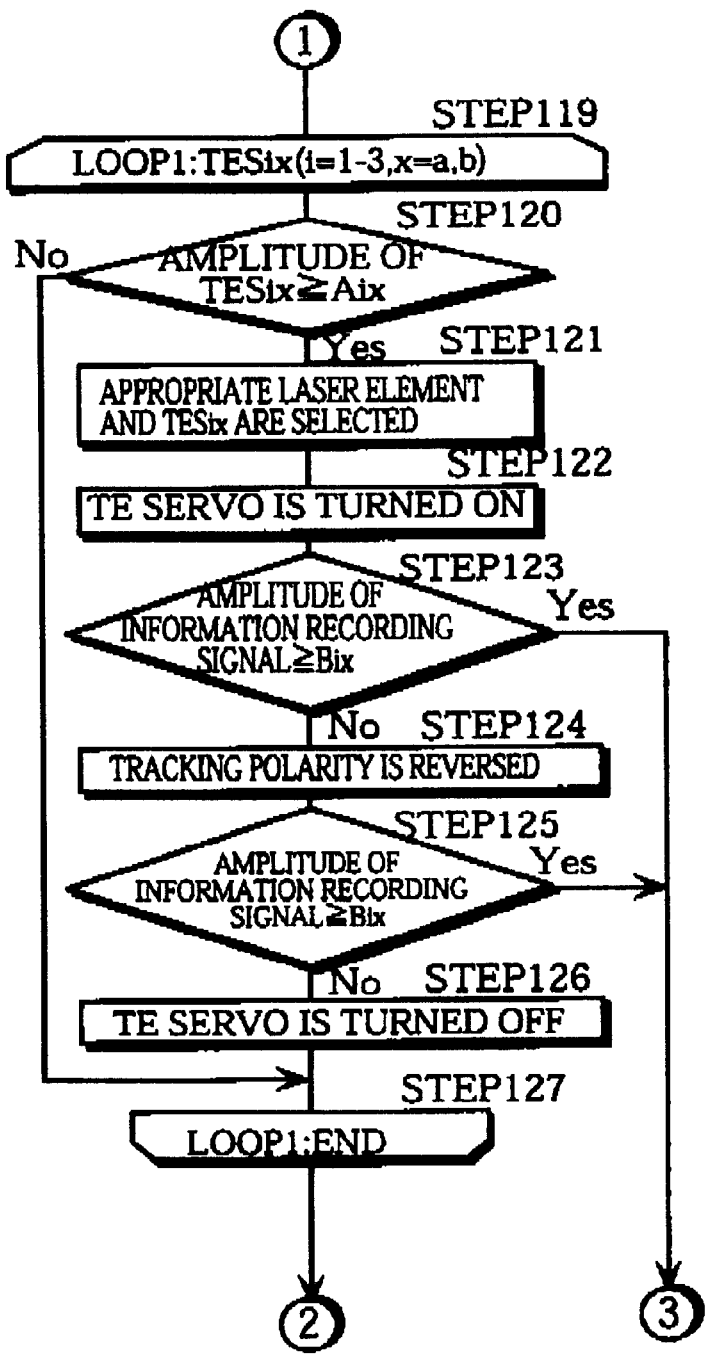

FIGS. 13A and 13B are flow charts showing the judgement processing of the judgement circuit 301 in detail.

The judgement processing shown in this drawing is performed immediately before an optical reproduction apparatus accesses the optical recording medium placed therein for the first time. More specifically, this processing is performed, for instance, when an optical recording medium is placed in a disc unit (not shown) of the optical reproduction apparatus.

As shown in FIG. 13A, the judgement circuit 301 first tries to judge the type of the optical recording medium according to the shape of part of the cartridge (or the caddy) containing the optical recording medium (step 101). If the judgement in step 101 has not succeeded, the judgement circuit 301 then have the semiconductor laser element 17a emit a red laser beam (step 102) and judges whether the amplitude of the focus error signal FE, which is detected while the focus servo is off, is not below a predetermined value K1 (step 103). In this specification, the amplitude of a signal is, for instance, the difference between the maximum peak values of the signal in a positive direction and those in a negative direction.

The distance between the optical pickup 1 and the information recording surface of the optical recording medium 4 slightly changes while the optical recording medium 4 is rotating due to the optical recording medium 4 being warped and the spindle wobbling during rotation. Therefore, the signal FE usually changes cyclically under the condition where the focus servo is off. If the wavelength of the current laser beam is suitable for the focus error signal detection for the optical recording medium 4, an appropriate amplitude level is obtained for the signal FE. If the wavelength of the current laser beam is not suitable for the focus error signal detection, the level of the signal FE becomes low and the amplitude level of the signal FE also becomes low.

If the judgement result in step 103 is that the amplitude level of the signal FE is not below the predetermined value K1, the judgement circuit 301 judges that the red laser beam is suitable for the focus error signal detection and turns on the focus servo under a condition where the laser beam element 17a remains selected (step 104).

The judgement circuit 301 then measures the amplitude of each of PDD_TES1, PH_TES2, and 3B_TES3 that are respectively obtained from the differential push-pull circuit 29, the phase comparison calculation circuit 30, and the three-beam calculation circuit 31 (step 108).

The judgement circuit 301 then switches the light source from the semiconductor laser element 17a to the semiconductor laser element 17b and have the semiconductor laser element 17b emit an infrared laser beam (step 109). Following this, the judgement circuit 301 measures the amplitude of each of DPP_TES1, PH_TES2, and 3B_TES3 that are respectively obtained from the differential push-pull circuit 29, the phase comparison calculation circuit 30, and the three-beam calculation circuit 31 (step 110).

If the judgement result in step 103 is that the amplitude level of the signal FE is below the predetermined value K1, the judgement circuit 301 judges that the luminescent color (red) of the semiconductor laser element 17a is not suitable for the focus error signal detection for the optical recording medium 4. As a result, the processing proceeds to step 105 and the judgement circuit 301 switches the light source from the semiconductor laser element 17a to the semiconductor laser element 17b and have the semiconductor laser element 17b emit an infrared laser beam. The judgement circuit 301 then judges whether the amplitude of the signal FE obtained for the infrared laser beam is not below a predetermined value K2 (step 106). If the judgement result in step 106 is positive, the judgement circuit 301 turns on the focus servo (step 107) and measures the amplitude of each of DPP_TES1, PH_TES2, and 3B_TES3 (step 110).

If the judgement result in step 106 is negative, the judgement circuit 301 judges that there is no laser beam appropriate to the optical recording medium 4 and displays an error message on a display unit (not shown) (step 113) to terminate the judgement processing. Note that the values K1 and K2 are predetermined by experiment and are prestored in an internal memory.

In the flow chart shown in FIG. 13A, the tracking error signals obtained when the semiconductor laser element 17a emits a red laser beam are referred to as TES1a, TES2a, and TES3a (in step 108) and the tracking error signals obtained when the semiconductor laser element 17b emits an infrared laser beam are referred to as TES1b, TES2b, and TES3b (in step 110). Because the tracking servo is turned off when these tracking error signals are detected, the spot of a laser beam travels back and forth across a plurality of tracks due to the eccentricity inherent in the optical recording medium and the eccentricity caused when the optical recording medium is placed. As a result, the tracking error signal obtained with a detection method appropriate to the optical recording medium becomes a sine wave signal having an amplitude not below a predetermined level and the tracking error signal obtained with a detection method inappropriate to the optical recording medium becomes a sine wave signal, which has an amplitude below a predetermined level, or a signal close to direct current. Depending on the type of the optical recording medium, a single tracking error signal having an amplitude not below a predetermined level is obtained in some cases and a plurality of such tracking error signals are obtained in other cases.

The judgement circuit 301 judges the physical shape of the optical recording medium, that is, whether the track shape is continuous grooves or pit sequences, whether the phase depth of each groove or pit is λ/4 of the wavelength of a red laser and an infrared laser, and whether the track density is high or low, When doing so, the judgement circuit 301 uses the amplitude levels of the six tracking error signals described above. The judgement circuit 301 then determines the type of the optical recording medium according to the judgement results (step 111). It should be noted here that a single media type is selected for the optical recording medium in some cases and several media types are selected as the candidates for the type of the optical recording medium (several possible media types are selected) in other cases.

More specifically, the judgement circuit 301 prestores a table shown in FIG. 14 and determines the physical shape and type of the optical recording medium by referring to this table according to the amplitude levels of the six tracking error signals. In the table, each combination of the six tracking error signals is associated with one physical shape and one media type.

If several media types are selected as the candidates for the type of the optical recording medium (step 112:No), the processing proceeds to the operations in the flow chart shown in FIG. 13B and the judgement circuit 301 judges whether each of the six tracking error signals has an appropriate amplitude level in a predetermined order (the loop processing from step 119 to step 127).

More specifically, the judgement circuit 301 compares the amplitude of DPP_TES1$a$ measured in step 108 with a threshold value A1$a$ (step 120). Here, a threshold value Ai$x$ (i=1–3, x=a or b) for each of the six tracking error signals is prestored in the judgement circuit 301. The threshold value Ai$x$ is, for instance, set as a portion (one-half, for instance) of the maximum value of the received light amount obtained as a focus error signal.

If the amplitude of DPP_TES1$a$ is not below the threshold value A1$a$, the judgement circuit 301 selects the semiconductor laser element 17$a$ (has the semiconductor laser element 17$a$ emit a red beam), controls the selection circuit 302 to select TES1 from the differential push-pull circuit 29 (step 121), turns on the tracking servo of the tracking servo circuit 303 (step 122), and judges whether the amplitude of an information recording signal is not below a threshold value B1$a$ (step 123). If the judgement result in step 123 is negative, the judgement circuit 301 has the tracking servo circuit 303 reverse the tracking polarity (step 124), and judges whether the amplitude of the information recording signal is not below the threshold value B1$a$ again (step 125).

If the amplitude of the information recording signal is not below the threshold value B1$a$ in step 123 or step 125, the judgement circuit 301 terminates the processing under a condition where the current tracking error signal remains selected. If the amplitude of the information recording signal is below the threshold value B1$a$ in step 125, the judgement circuit 301 temporarily turns off the tracking servo (step 126) and returns to step 120 to perform the same processing for the next TESi$x$.

In this manner, a tracking error signal having a required amplitude level is selected from the six tracking error signals. As a result, an appropriate tracking error signal is selected for any type of optical recording medium placed in the optical reproduction apparatus.

If the amplitude of every tracking error signal (TESi$x$) is found below the threshold value Ai$x$ (step 120:No) and the amplitude of the information recording signal of every tracking error signal is found below the threshold value Bi$x$ (step 123 and step 125:No), there is no appropriate tracking error signal. Therefore, the judgement circuit 301 displays an error message to terminate the judgement processing (step 118 in FIG. 13A). This error message is displayed, for instance, when an unexpected medium is placed, a medium is erroneously placed upside down, or no medium is placed.

If one media type is selected for the optical recording medium in step 101 or step 112, the judgement circuit 301 selects a semiconductor laser element and a tracking error signal that are appropriate to the optical recording medium (step 113). Like the operations in steps 122–125, the judgement circuit 301 then checks whether the information recording signal has a required amplitude level (steps 114–117), and terminates the judgement processing.

<Judgement of Physical Shape and Media Type>

The judgements of the physical shape and media type in step 111 shown in FIG. 13A are described in detail below with reference to FIG. 14.

FIG. 14 shows an example table where each combination of judgement results of the judgement circuit 301 for the six tracking error signals is associated with one physical shape, one media type, one semiconductor laser element, and one tracking error signal. This table is prestored in the judgement circuit 301 and is referred to during the judgements of the physical shape and media type in step 111.

In this drawing, the "judgement result of tracking error signal" column gives signs "×", "*", "◉", "○", and "Δ". Each of the signs "×" and "*" indicates that the amplitude of the corresponding tracking error signal is below the threshold value. Also, each of the signs "◉", "○", and "Δ" indicates that the amplitude of the corresponding tracking error signal is not below the threshold value. Note that the sign "*" also indicates that an amplitude not below the threshold value can be obtained for the corresponding tracking error signal by adjusting the beam positions. Also, it is preferable to sequentially select the tracking error signal corresponding to the sign "◉", that corresponding to the sign "○", and that corresponding to the sign "Δ" in this order to drive the tracking servo.

The "physical shape" column gives physical shapes corresponding to respective combinations of the judgement results. The physical shapes in this column relate to whether pre-pits (pit sequences without grooves) or continuous grooves are formed, whether the phase depth is around $\lambda/4$, whether the recording density is high or low, and whether the media type is a write-once optical recording medium that includes unused areas. Here, if an optical recording medium is a low-density medium, the track pitch is around 1.5–1.6 $\mu$m; if an optical recording medium is a high-density medium, the track pitch is around 0.6–1.0 $\mu$m.

The "media type" column gives media types that may correspond to respective combinations of the judgement results.

The "laser selection" column and "TES selection" column respectively give a semiconductor laser element and a tracking error signal detection method that should be selected for each combination of the judgement results. In the "laser selection" column, "red" means that the semiconductor laser element 17$a$ should be selected, "infrared" means that the semiconductor laser element 17$b$ should be selected, and "(red)" means that the semiconductor laser element 17$a$ that emits a red laser beam may be selected instead of the semiconductor laser element 17$b$ that emits an infrared laser beam.

In step 111 described above, the judgement circuit 301 judges the physical shape and type of the optical recording medium by referring to this table, and informs other circuits, which are included in the optical reproduction apparatus, of the physical shape and media type. This judgement processing is performed using the amplitude levels of the six tracking error signals. Therefore, although not being capable of judging the physical shapes and media types of all optical recording media including new media that will appear on the market in the future, the judgement circuit 301 is applicable to almost all representative optical recording media. If the table gives information for the current combination of judgement results of the six tracking error signals, the judgement circuit 301 selects a semiconductor laser element and a tracking error signal, which correspond to the combination of the judgement results, from the "laser selection" column and the "TES selection" column in the table.

With the construction described above, the circuit system detects a focus error signal according to the SSD method using both of a red laser light and an infrared laser light. While the tracking servo is off, the circuit system also detects a plurality of types of tracking error signals according to the differential push-pull method, the differential phase detection method, and the three-beam method. This tracking error signal detection is also performed using both of a red laser light and an infrared laser light. The judgement circuit 301 then selects a laser light and a tracking error signal, which are appropriate to the current optical recording medium, according to the amplitude levels of the six tracking error signals. The judgement circuit 301 also determines the physical shape and type of the current optical recording medium according to the amplitude levels of the six tracking error signals.

As described above, in the photodetector unit of the present embodiment, a plurality of photodetectors are arranged in the manner shown in FIG. 4 and this arrangement is suitable for the detection of three types of tracking error signals in addition to a focus error signal. As a result, this photodetector unit is compatible with various types of optical recording media.

Also, as shown in FIG. 3, the main part of the optical pickup of the present embodiment has a construction where the frame 16 including the photodetector unit 10 is integrated with the transparent substrate 22 and the hologram optical component 23. Also, the principal ray of the outgoing light from the semiconductor laser component 17 approximately matches the principal ray of the returning light from the optical recording medium 4. Therefore, the hardware scale of the present optical pickup can be reduced. Also, the positional relations between the photodetector unit at the bottom of the frame 16, the transparent substrate 22, and the hologram optical component 23 are predetermined to have each returning light converge on a corresponding photodetector. This saves the need for complicated positional adjustments during assembling. Further, because both of positive and negative first-order diffraction lights from the returning light hologram 25 are received in the optical pickup, light is used with high efficiency in comparison with a conventional component where semiconductor laser elements and photodetectors are integrated into one piece.

With the optical pickup including the photodetector unit described above, the optical reproduction apparatus of the present embodiment detects three types of tracking error signals according to the differential push-pull method, the differential phase detection method, and the three-beam method while the servo is off. The optical reproduction apparatus then selects a tracking error signal and a laser light, which are appropriate to the current optical recording medium, according to the amplitude levels of the detected tracking error signals. The optical reproduction apparatus also judges the physical shape and the type of the current optical recording medium with considerably high accuracy according to the amplitude levels of the detected tracking error signals.

<Modifications>

Modifications of the present embodiment are described below.

(1) Steps 101, 111, 112, and 113–117 in the flow chart shown in FIG. 13A may be omitted and the operations in steps 119–127 shown in FIG. 13B may be performed after step 110.

In this case, the judgement circuit 301 does not judge the physical shape and media type of an optical recording medium but a tracking error signal having an amplitude level necessary for the tracking servo is appropriately selected from the six tracking error signals by the loop processing from step 119 to step 127. During this selection, the amplitude levels of DPP_TES1, PH_TES2, and 3B_TES3 generated by a red laser light are sequentially checked in this order. Also, the amplitude levels of DPP_TES1, PH_TES2, and 3B_TES3 generated by an infrared laser light are sequentially checked in this order. This is because it is expected that high-density optical recording media will be mainstream in the future and the tracking error signal detected with a method that is more appropriate to high-density optical recording media is given a higher priority.

However, the tracking error signal detected with the three-beam method may be given the highest priority because the control for this method is the simpliest. Also, the type of each optical recording medium that was previously placed may be recorded and the method appropriate to the media type that was more frequently used is given a higher priority.

(2) To judge the physical shape and type of an optical recording medium in step 111, the judgement circuit 301 may also use the judgement result in step 101 where the media type is judged using the shape of part of the cartridge. This allows the media type judgement and the tracking error signal selection to be performed with higher accuracy.

(3) The judgement circuit 301 may calculate a reflectivity and judge the physical shape and type of an optical recording medium using the reflectivity. More specifically, for instance, the judgement circuit 301 may calculate the distribution of a reflectivity and judge the physical shape and type of an optical recording medium using the reflectivity distribution. This allows the media type judgement to be performed with higher accuracy.

Figure 15:
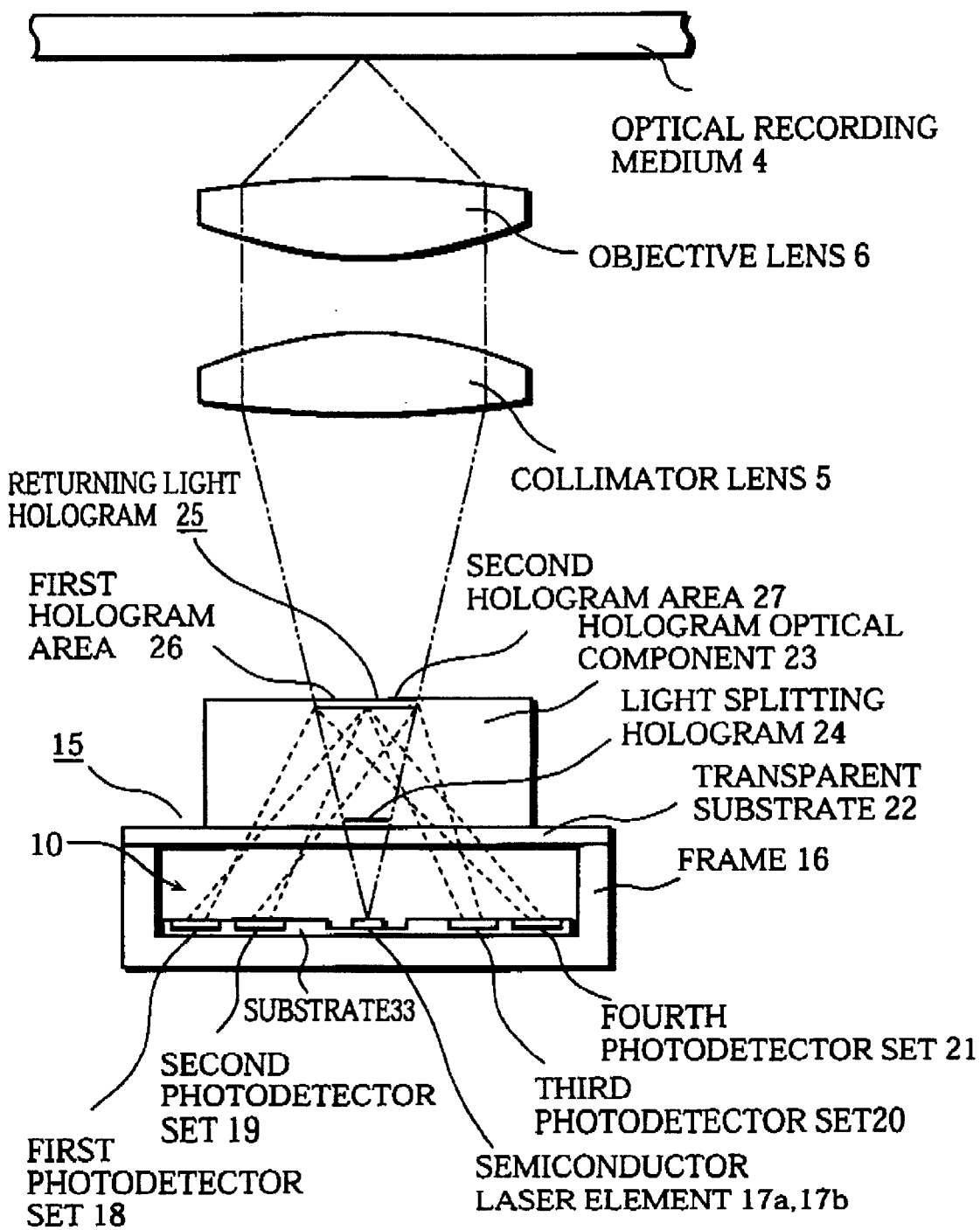
FIG. 15 shows the optical system of the optical pickup and the construction of a photodetector device using a photodetector unit whose construction elements are all formed on the same semiconductor substrate.
Figure 16:
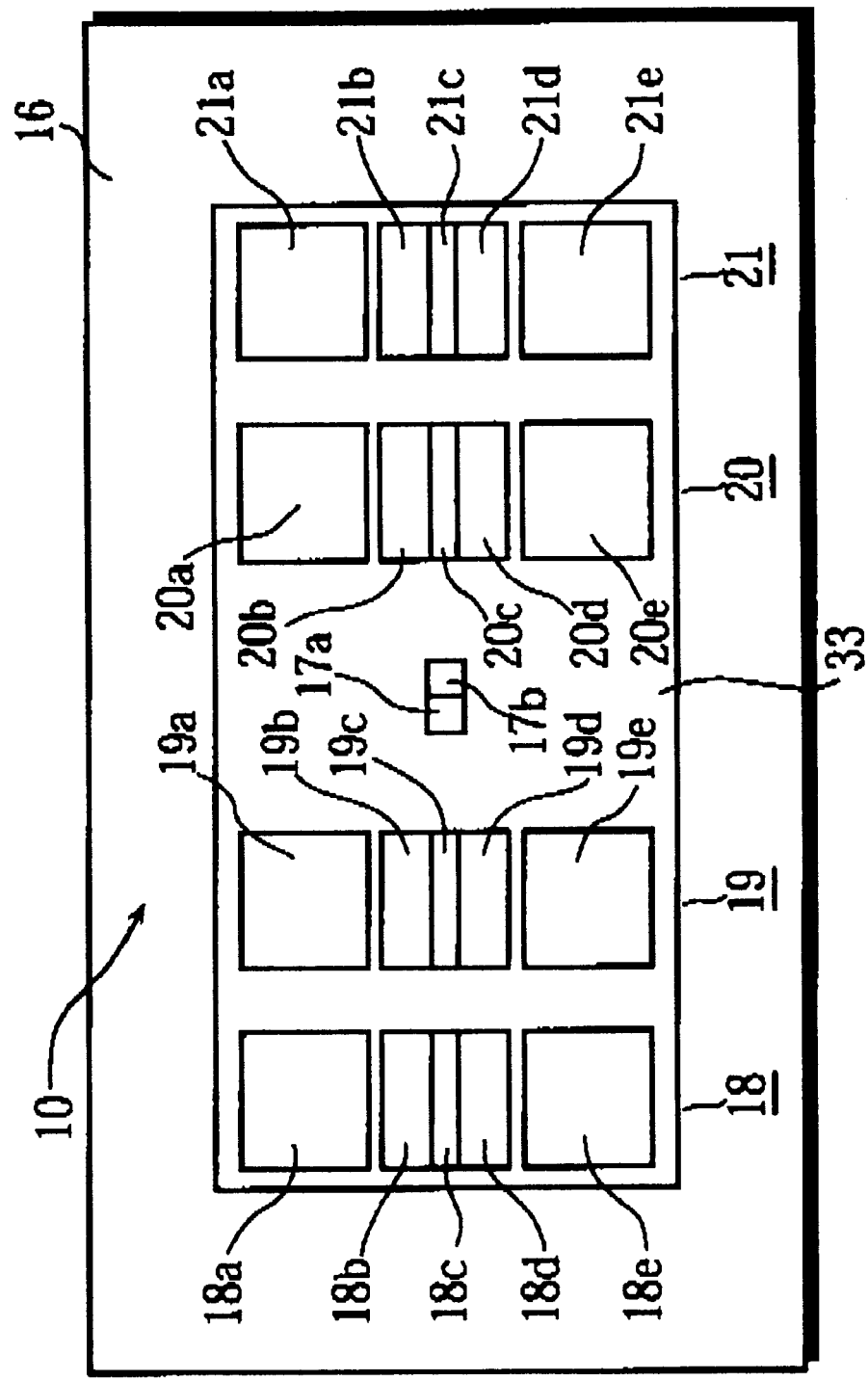
FIG. 16 shows how the photodetectors formed on the semiconductor substrate are arranged.

(4) An optical pickup shown in FIG. 15 may be used instead of that shown in FIG. 3. As can be understood by comparing FIGS. 3 and 15, the optical pickup shown in FIG. 15 includes a photodetector unit produced by forming photodetectors on a substrate 33. Other aspects of the optical pickup shown in FIG. 15 are the same as those of the optical pickup shown in FIG. 3, so that the following description centers on the differences. The present photodetector unit is produced by forming photodetectors on the substrate 33 with a semiconductor processing technique. FIG. 16 shows the substrate 33 arranged at the bottom of the frame 16. As can be seen from this drawing, the photodetectors of this modification are arranged in the same manner as those shown in FIG. 4.

In this case, it does not matter whether the semiconductor laser elements 17a and 17b are provided on the substrate 33 in a hybrid manner or in a monolithic manner. For instance, the semiconductor laser elements 17a and 17b are flat light-emitting semiconductor laser elements formed with a semiconductor processing technique. In terms of mass productivity and cost, it is preferable to form photodetectors on a single semiconductor substrate as described above.

In this case, photodetectors are formed at appropriate positions with higher accuracy using a semiconductor processing technique. As a result, the number of steps for adjusting the positions of the photodetectors is reduced in comparison with the case of the optical pickup shown in FIG. 3.

Also, because the photodetector unit 10 is produced as a single component by forming every photodetector on the substrate 33, the number of assembling steps and cost can be reduced in comparison with the case where the photodetector unit 10 is produced by arranging separate photodetectors on the frame.

Further, if the semiconductor laser elements 17a and 17b are also formed on the substrate 33, the semiconductor laser elements 17a and 17b and the photodetectors are all integrated into a single component. In this case, the adjustment cost, assembling cost, and the number of parts are further reduced.

Figure 17:
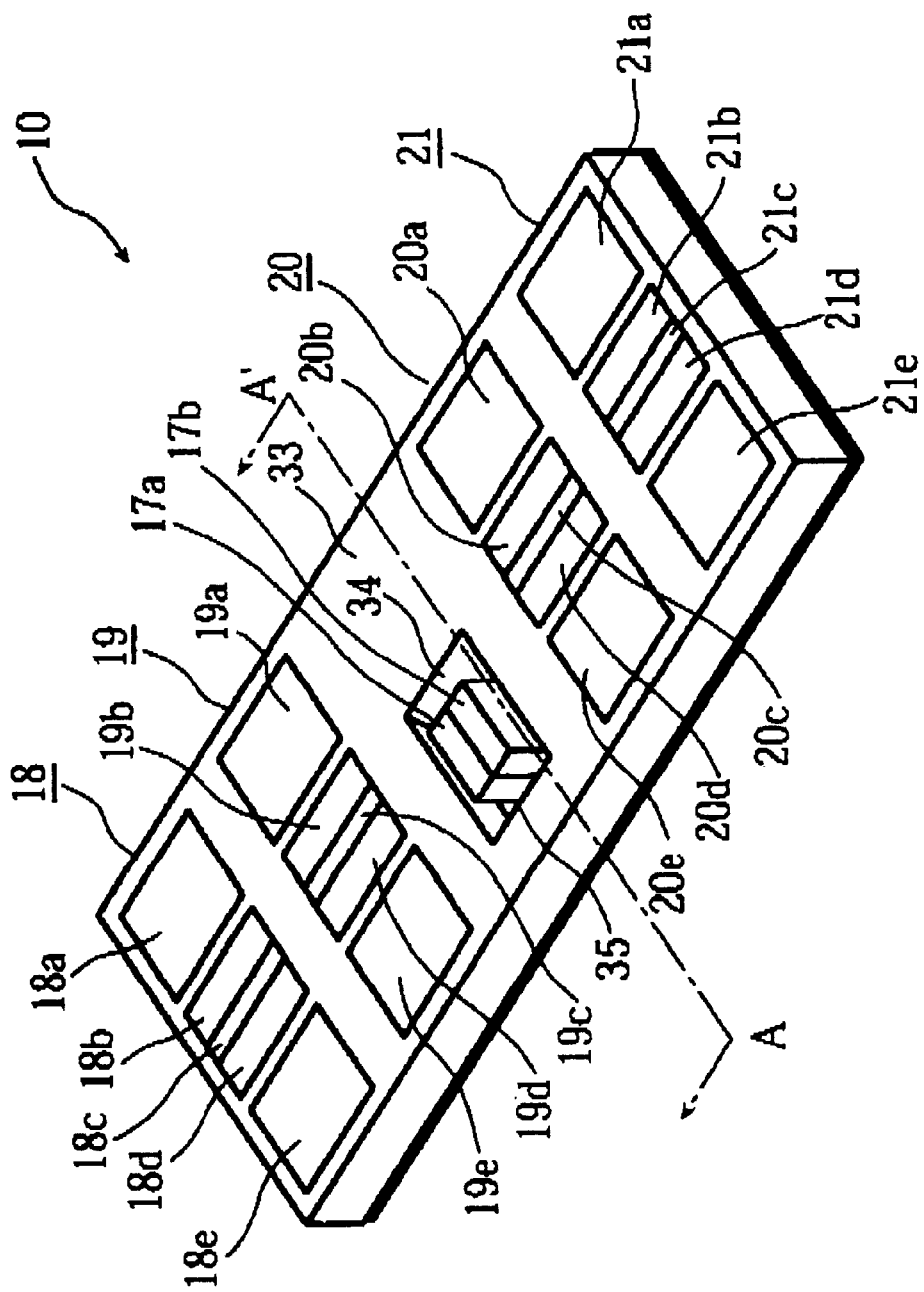
FIG. 17 is a perspective view of a photodetector unit that is provided with a depression having a reflection plane is with an angle of around 45 degrees to the surface of the semiconductor substrate.
Figure 18:
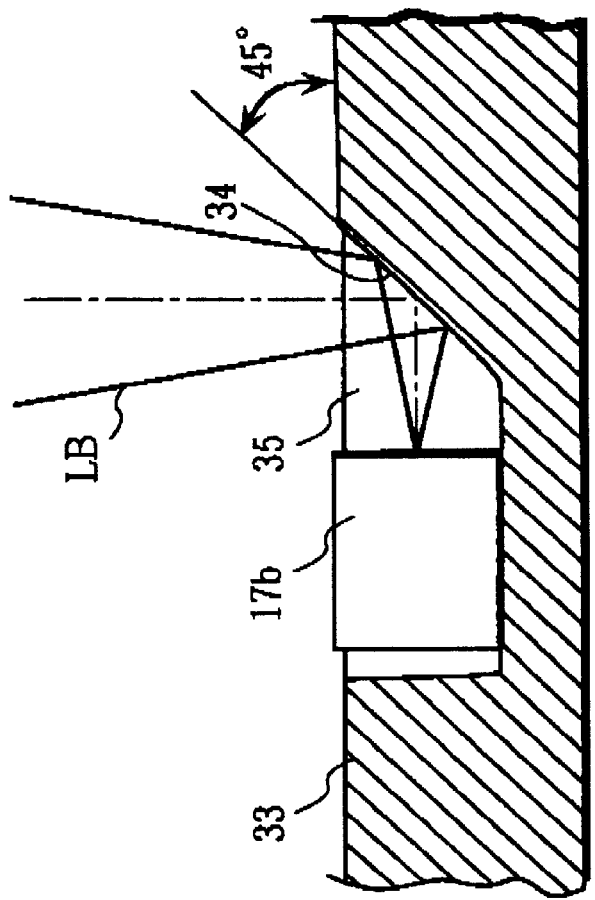
FIG. 18 is a sectional view of the photodetector unit taken along line A–A' of FIG. 17.

(5) FIG. 17 shows a case where the photodetector unit 10 shown in FIG. 16 is modified by providing the semiconductor laser elements 17a and 17b in a hybrid manner. As shown in FIG. 17, a depression 35 is formed at the center of the substrate 33 with a semiconductor processing technique. The depression 35 has a reflection plane (a mirror plane) with an angle of around 45 degrees to the surface of the substrate 33 and end-face light-emitting semiconductor laser elements 17a and 17b are provided in the depression 35. FIG. 18 is a sectional view taken along line A–A' of FIG. 17. As shown in FIG. 18, the semiconductor laser element 17a or 17b emits the laser beam LB toward the reflection plane 34, which then directs the laser beam LB toward an optical recording medium.

With this construction, the positional relations between the semiconductor laser elements 17a and 17b and the photodetectors can be adjusted in a two-dimensional manner by changing the direction of travel of the principal ray reflected by the reflection plane 34. That is, by merely adjusting the positions of the semiconductor laser elements 17a and 17b at the bottom of the depression 35 in a two-dimensional manner, the principal ray of a laser beam is brought to match the optical axis of the objective lens 6 and the length of the optical path from the light-emitting point of the semiconductor laser element 17a or 17b to the objective lens 6 is adjusted. As a result, the optical adjustments during assembling become easy and thus the cost of manufacturing is reduced.

Note that the angle of the reflection plane 34 is not limited to 45 degrees. That is, this angle can be set freely so long as reflection light is incident on the light splitting hologram 24. When doing so, the light emitting angles of the semiconductor laser elements 17a and 17b also need to be taken into account.

Also, instead of providing the semiconductor laser elements 17a and 17b in a hybrid manner, a two-wavelength semiconductor laser element formed on a single substrate may be provided on the substrate 33.

(6) The current-voltage conversion circuits and wires shown in FIG. 8 are also provided on the substrate 33 shown in FIGS. 16 and 17. The current-voltage conversion circuits and wires can be formed without difficulty using a semiconductor processing technique. In addition, it is preferable to form all or some of the focus error calculation circuit 28, the differential push-pull circuit 29, the phase comparison calculation circuit 30, the three-beam calculation circuit 31, the judgement circuit 301, and the selection circuit 302 shown in FIG. 7 as an integrated circuit on the substrate 33 with a semiconductor processing technique.

In this case, the photodetector unit and other circuits are integrated on the substrate 33. As a result, the number of assembling steps, the number of adjusting steps, and the manufacturing cost are reduced. Because the number of assembling steps and the number of adjusting steps are reduced, the reliability of the optical reproduction apparatus is increased.

Figure 19:
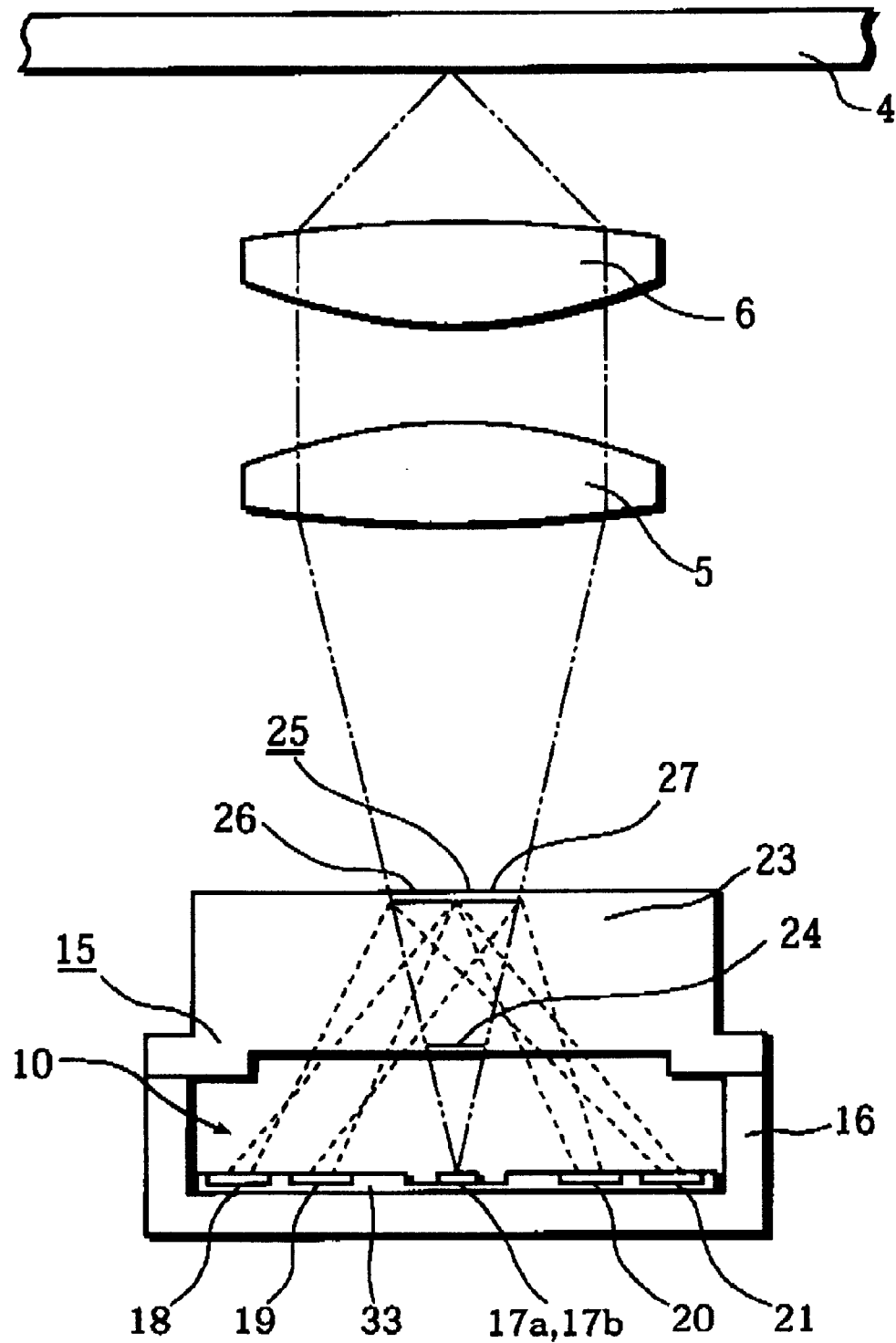
FIG. 19 shows an example construction where a case is composed of a hologram optical component and a frame of the photodetector device.

(7) As shown in FIG. 19, the frame 16 may be covered with the hologram optical component 23 instead of the transparent substrate 22. That is, the transparent substrate 22 and the hologram optical component 23 may be integrated into one piece.

In this case, because a case is composed of the hologram optical component 23 and the frame 16, the positional relations between the hologram optical component 23 and the photodetector unit 10 in the frame 16 can be adjusted without difficulty. This construction also contributes to reduce the number of parts and the number of manufacturing steps of an optical reproduction apparatus, in comparison with the case where the transparent substrate 22 and the hologram optical component 23 are separate components. As a result, an inexpensive optical reproduction apparatus can be achieved.

Although the hologram optical component 23 of the optical reproduction apparatus of the present embodiment can be made of an optical glass or resin, it is preferable to use a resin as the material of this component 23. This is because the shape of the hologram optical component 23 can be freely designed with the resin. For instance, the transparent substrate 22 and the hologram optical component 23 can be integrated into one piece. Also, because the hologram optical component 23 can be formed using a mold if this component is made of a resin, hologram optical components having stable characteristics can be mass-produced. This achieves an inexpensive optical reproduction apparatus.

(8) As shown in FIG. 2, in the optical pickup 1 of the present embodiment, only the objective lens 6 is provided on the movable member 103 and moves according to the servo signals sent from the focus servo circuit 304 and the tracking servo circuit 303.

With this construction, the focal point is adjusted and the information recording sequences are traced by moving only the objective lens 6. Therefore, in this case, the principal ray of a laser beam emitted from a semiconductor laser element may deviate from the optical axis of the objective lens 6. This results in lens aberrations and degrades the optical characteristics of the optical pickup 1. As a result, information recording signals cannot be written onto or read from the optical recording medium 4 with accuracy.

To overcome this problem, the semiconductor laser elements and collimator lens, in addition to the objective lens 6, may also be provided on the movable member 103. With this construction, the positional relations between these construction elements can remain invariant and the optical deviations in the optical system of the optical pickup 1 can be avoided.

Figure 20:
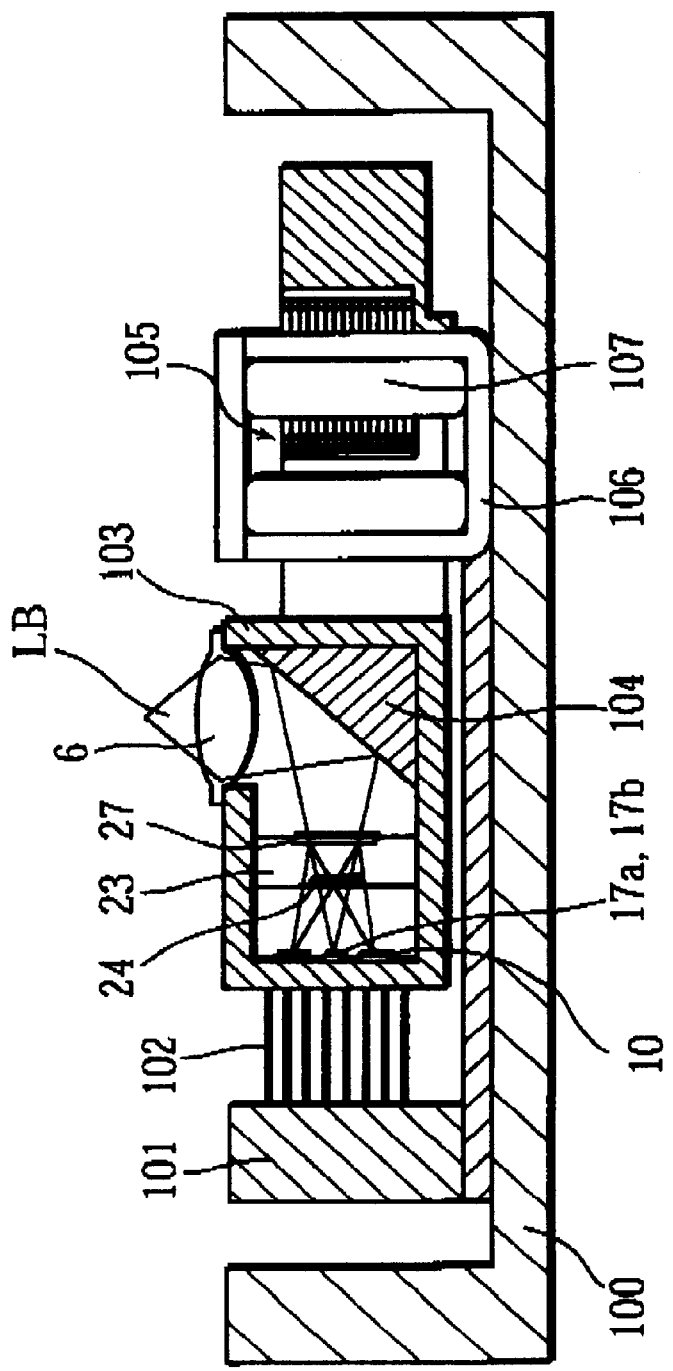
FIG. 20 is a longitudinal sectional view of an optical pickup of a modification.

FIG. 20 is a longitudinal sectional view of the optical pickup 1 modified in this manner. Note that the same construction elements as in FIG. 2 are assigned the same numbers. The following description centers on the differences between the optical pickups shown in FIGS. 2 and 20 and, therefore, omits the same aspects.

As shown in FIG. 20, the optical pickup 1 of this modification has a construction where the objective lens 6, the photodetector unit 10, the hologram optical component 23, and the mirror 104 are provided within a case-like movable member 103 and this movable member 103 is attached to the fixing member 101 using a plurality of supporting wires 102 so that the movable member 103 can move in a tracking direction or in a focusing direction. Here, the supporting wires 102 double as signal lines or power feeding lines to the photodetector unit 10 and the coil unit 105. Therefore, the number of the supporting wires 102 is appropriately set to be greater than the total number of the signal lines and power feeding lines. This saves the need to additionally connect leads to the movable member 103 and to route the leads to the outside. As a result, the movable member 103 moves smoothly and the information recording sequences of the optical recording media 4 are traced with high accuracy.

By providing all construction elements of the optical system of the optical pickup within the movable member 103 in this manner, the positional relations between the objective lens 6 and the semiconductor laser elements 17a and 17b can remain invariant even during the focusing operation and the tracking operation. As a result, the optical pickup of this modification exhibits stable optical characteristics, in comparison with the optical pickup shown in FIG. 2, and reproduction and recording operations are performed with accuracy.

(9) The present embodiment relates to an optical recording and reproduction apparatus. However, an apparatus specialized in the recording onto optical recording media or the reproduction of optical recording media may be constructed according to this embodiment.

<Second Embodiment>
<Construction>

Figure 21:
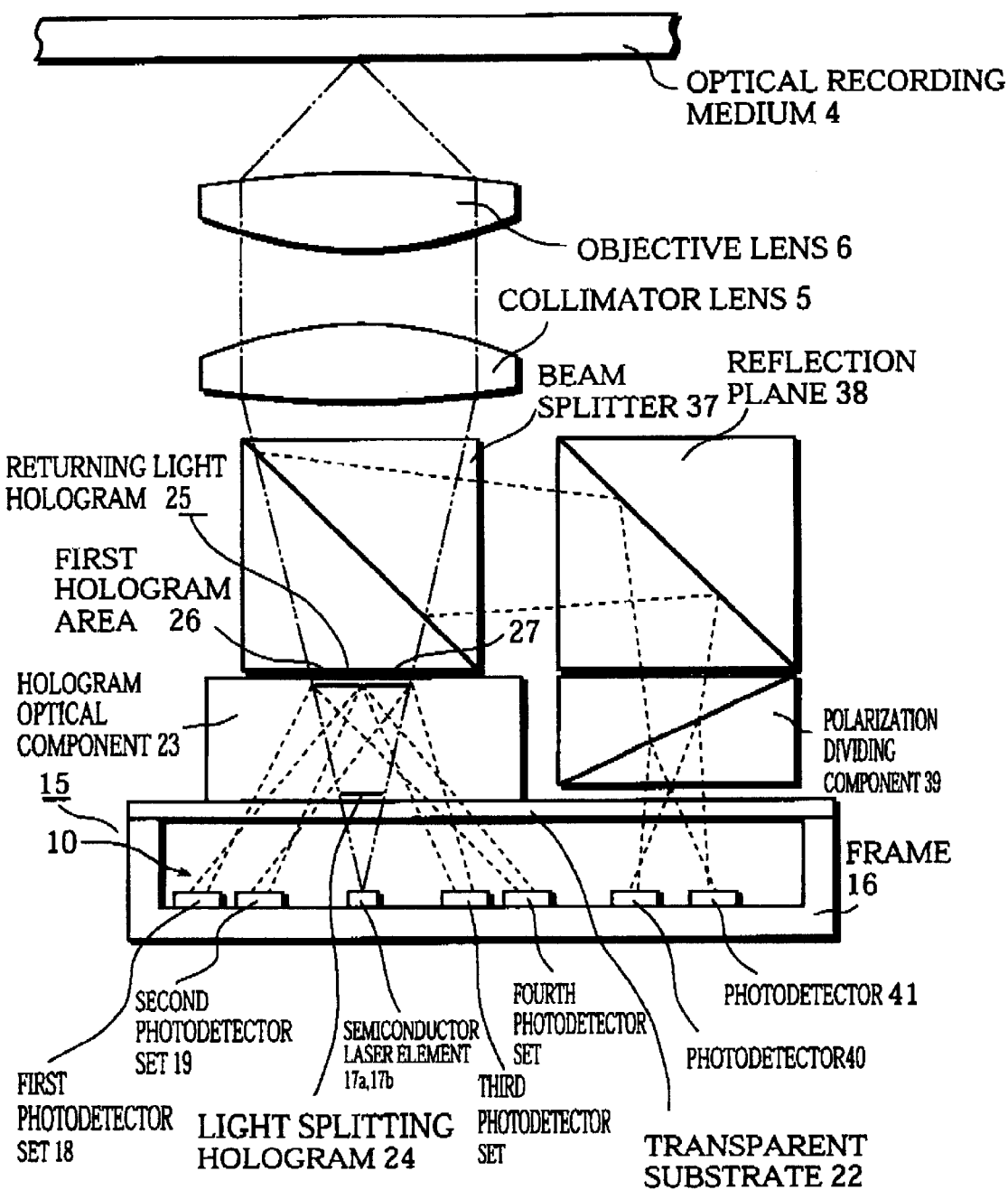
FIG. 21 shows the construction of the main part of an optical pickup according to the second embodiment of the present invention.

FIG. 21 shows the construction of the main part of an optical pickup 1 according to the second embodiment of the present invention. As can be understood by comparing FIGS. 3 and 21, the present optical pickup 1 further includes a beam splitter 37, a reflection plane 38, and a polarization divider 39. Also, the frame 16 is enlarged to further include photodetectors 40 and 41 as construction elements of the photodetector unit 10. The following description centers on the differences between the optical pickups of the first and second embodiments and, therefore, omits the same aspects. Also, the following description centers on the differences between the circuit systems of the first and second embodiments and, therefore, omits the same aspects.

The returning light from the optical recording medium 4 passes through the objective lens 6 and the collimator lens 5 and is divided by the beam splitter 37 into a reflection light, which is bent by 90 degrees, and a transmitted light. The reflection light is further bent by 90 degrees by the reflection plane 38 and strikes the polarization divider 39, which then divides the reflection light into two beams. These beams are respectively incident on the photodetectors 40 and 41.

Figure 22:
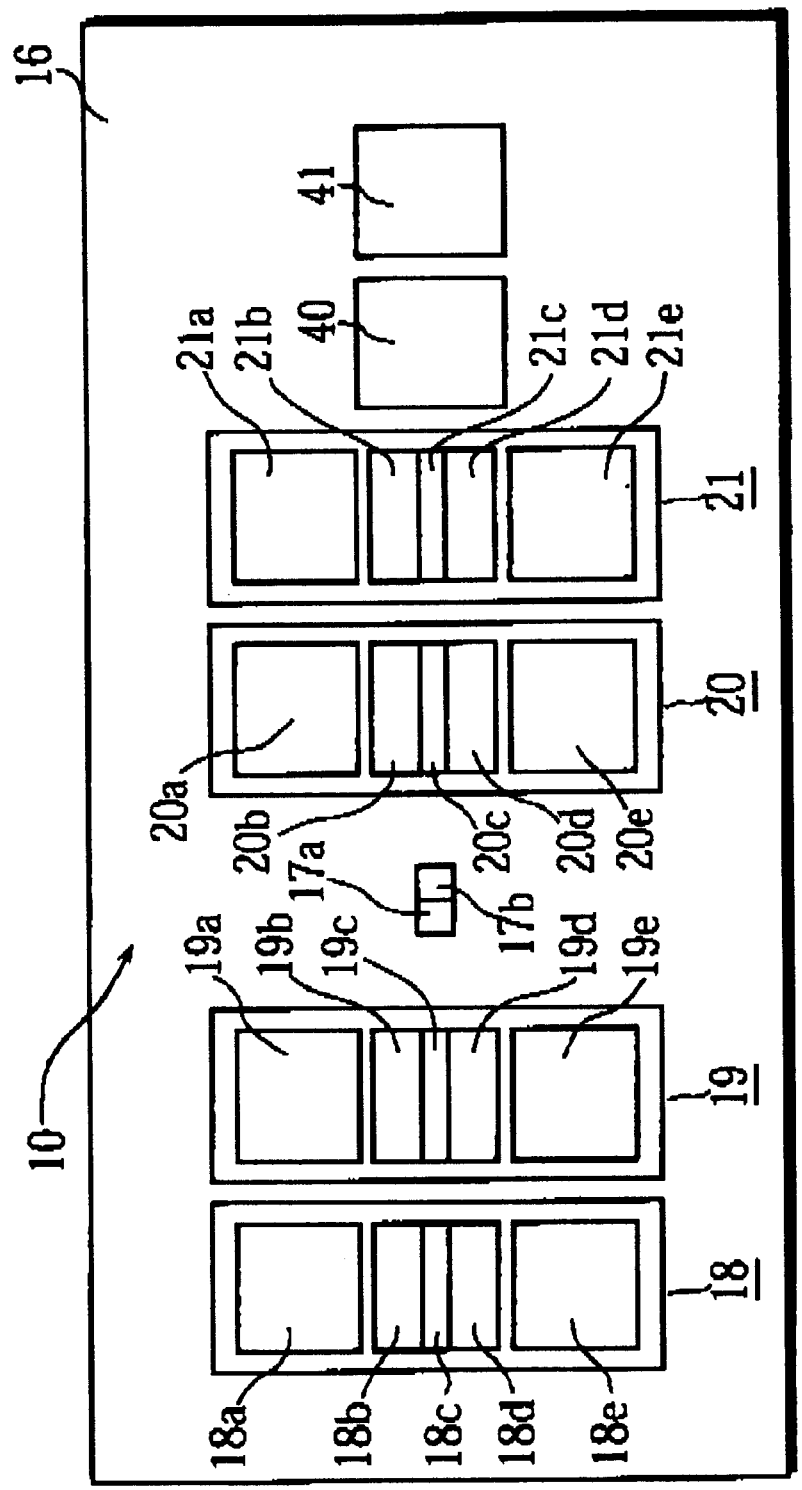
FIG. 22 shows the construction of a photodetector unit according to the second embodiment of the present invention.

The construction of the photodetector unit 10 in the frame 16 is shown in FIG. 22 As can be understood by comparing FIGS. 4 and 22, the photodetectors 40 and 41 are additionally used in this embodiment. The photodetectors 40 and 41 are arranged to receive two returning lights from the polarization divider 39.

The photodetectors 40 and 41 are used to read information recording signals from a magneto-optical recording medium or an optical recording medium of a reflectivity modulation type. If the optical recording medium 4 is a magneto-optical recording medium, an information reproduction circuit (not shown) reproduces information recording signals by calculating differences between outputs from the photodetector 40 and those from the photodetector 41. Also, if the optical recording medium 4 is an optical recording medium, on which pre-pits are formed, or an optical recording medium of a reflectivity modulation type, such as a phase change recording medium, the information reproduction circuit reproduces information recording signals by calculating the sums of outputs from the photodetector 40 and those from the photodetector 41.

In addition to the effect of the first embodiment, an optical reproduction apparatus equipped with the present optical pickup having this construction can selectively reproduce a magneto-optical recording medium and an optical recording medium of a reflectivity modulation type by respectively calculating differences between and sums of output signals of two returning lights generated by the polarization divider 39.

<Modifications>

It should be noted here that the effect described above can also be achieved by the following modifications of the optical reproduction apparatus of the second embodiment.

Figure 23:
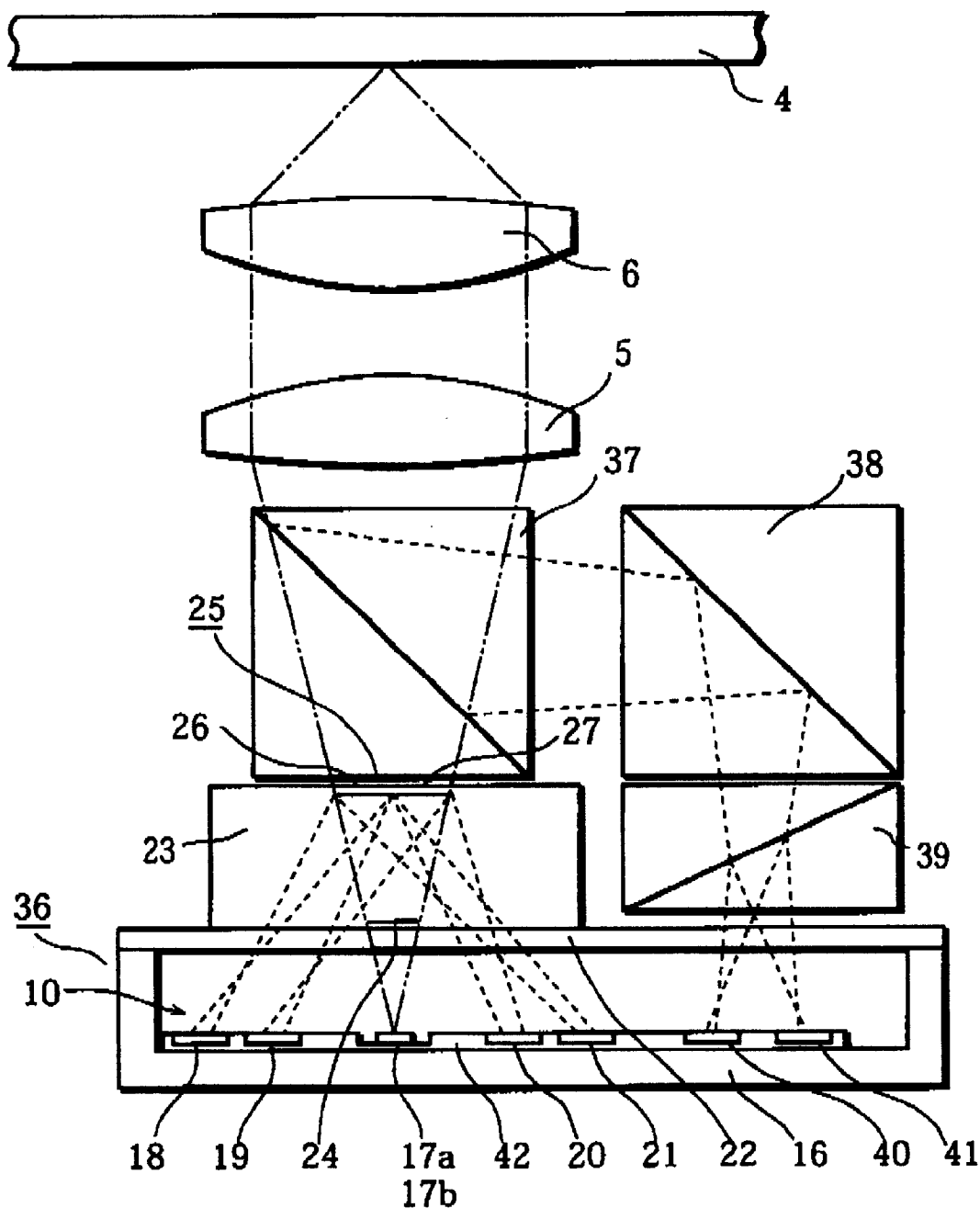
FIG. 23 shows the construction of the main part of an optical pickup according to a modification of the second embodiment, where the optical pickup is equipped with a photodetector unit in which semiconductor laser elements and photodetectors for reproducing information are mounted on the same substrate.
Figure 24:
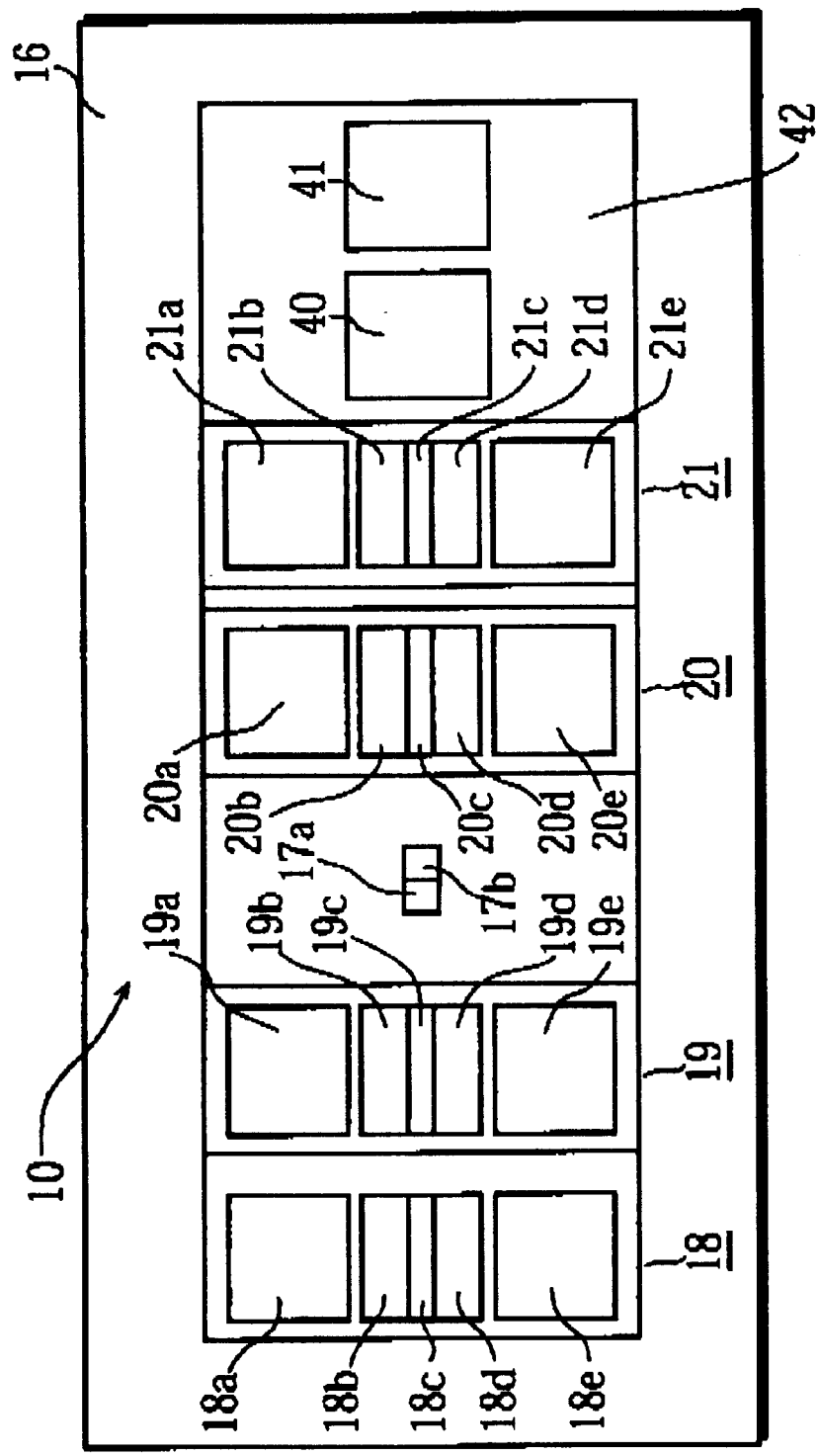
FIG. 24 shows how the construction elements of the photodetector unit shown in FIG. 23 are arranged.

(1) As shown in FIGS. 23 and 24, the semiconductor laser elements 17a and 17b, the photodetector units 18–21, and the photodetectors 40 and 41 may be integrally formed on a substrate 42. Also, it does not matter whether the semiconductor laser elements 17a and 17b are formed on the substrate 42 in a hybrid manner or in a monolithic manner. For instance, the semiconductor laser elements 17a and 17b may be flat light-emitting semiconductor laser elements formed with a semiconductor processing technique.

Figure 25:
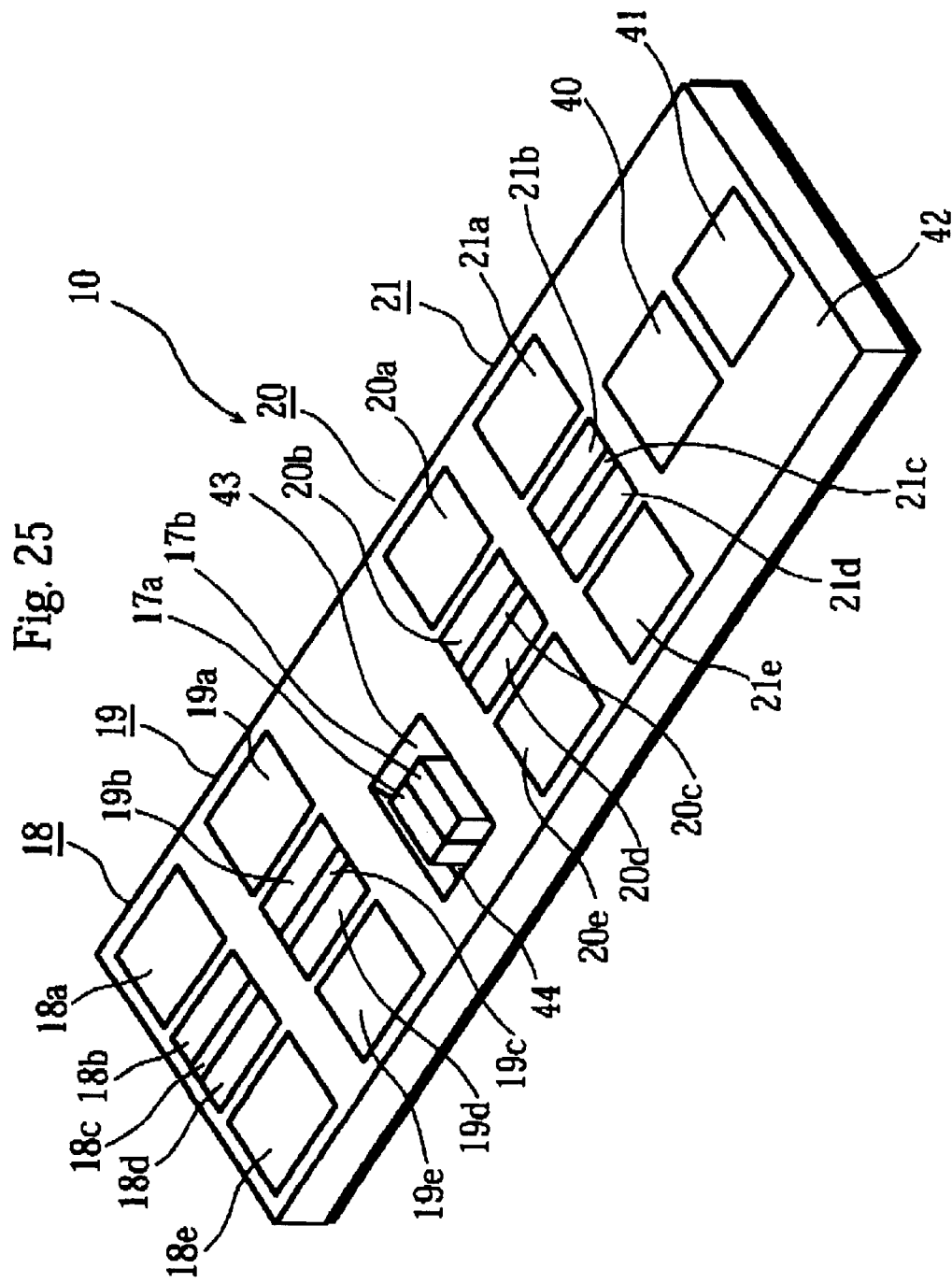
FIG. 25 is a perspective view of a photodetector unit that is provided with a depression having a reflection plane with an angle of around 45 degrees to the surface of the semiconductor substrate.

Also, as shown in FIG. 25, in addition to the photodetector sets 18–21 and the photodetectors 40 and 41, a depression 44 having a reflection plane 43 with an angle of around 45 degrees to the surface of the substrate 42 may be formed on the substrate 42 with a semiconductor processing technique. In this case, end-face light-emitting semiconductor laser elements 17a and 17b are provided in the depression 44. These semiconductor laser elements 17a and 17b emit light beams toward the reflection plane 43, which then directs the light beams toward an optical recording medium.

With this construction, in addition to the semiconductor laser component 17, the reflection plane 43 for reflecting the light beam emitted from the semiconductor laser component 17 is provided on the substrate 42. Therefore, by adjusting the direction of travel of the principal ray from the reflection plane 43, the positional relations between the semiconductor laser elements and the photodetectors can be controlled in a two-dimensional manner. Also, using a semiconductor processing technique, these construction elements can be formed on the same substrate with high accuracy. Therefore, in this case, the number of adjusting steps during production and the hardware scale and the number of parts of an optical reproduction apparatus can be reduced.

(2) At least one of an integrated circuit for performing the current-voltage conversion, calculation, and selection of focus error signals and tracking error signals and an integrated circuit for performing the current-voltage conversion and calculation of information recording signals may be formed on the substrate 42.

In this case, because at least one of these integrated circuits is formed on the substrate 42, there is no need to use an external integrated circuit for each integrated circuit formed on the substrate 42. This makes the optical reproduction apparatus resistant to external noise, such as floating noise, and reduces the hardware scale of the optical reproduction apparatus including the integrated circuits.

Figure 26:
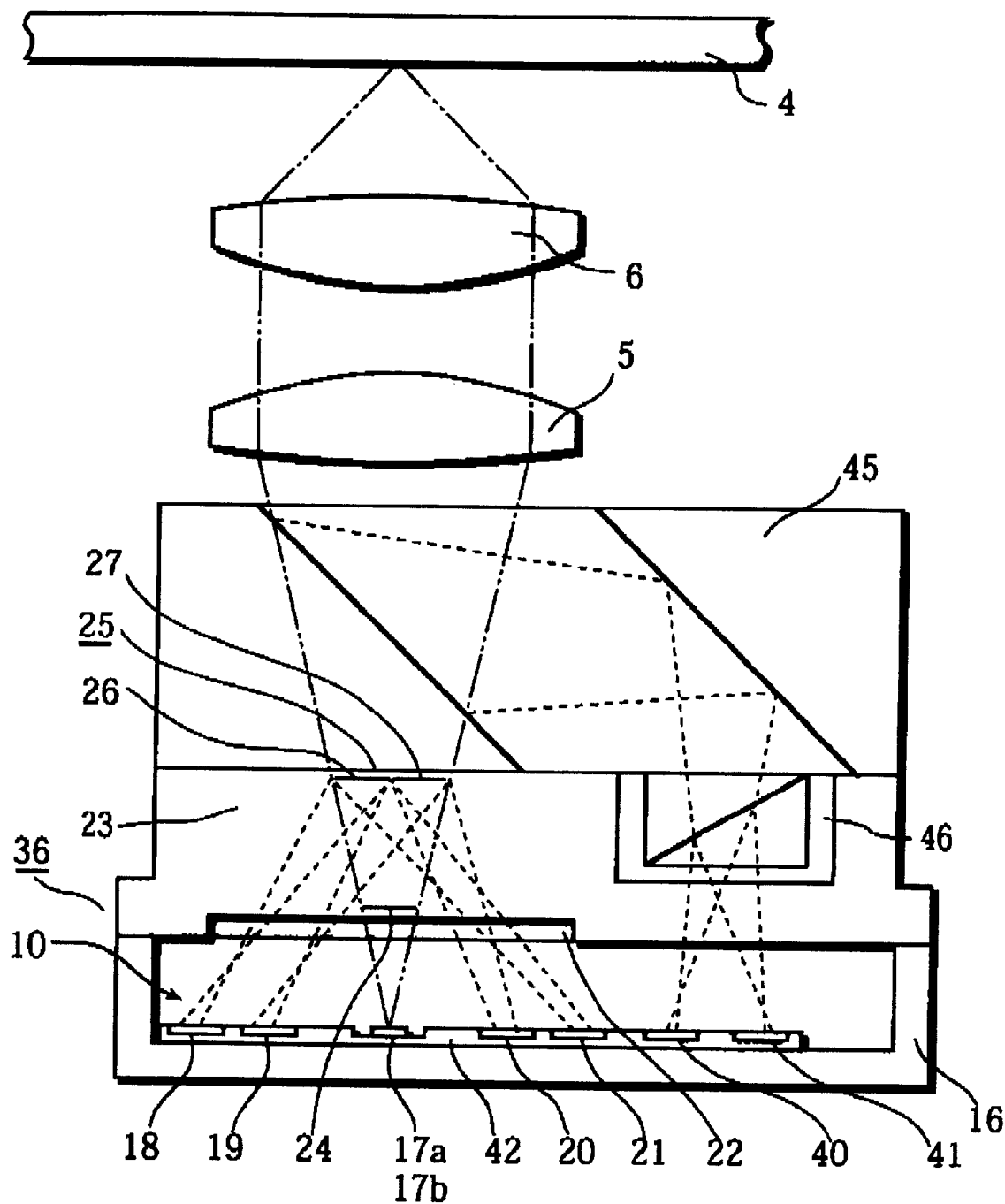
FIG. 26 shows the construction of the main part of an optical pickup where a beam splitter, a reflection plane, and a polarization divider are integrated into one piece.

(3) The beam splitter 37, the reflection plane 38, and the polarization divider 39 may be integrated into one piece. For instance, as shown in FIG. 26, a combination prism 45, into which the functions of these construction elements 37–39 are combined, may be used. Also, as shown in this drawing, the frame 16 may be covered with the hologram optical component 23 instead of the transparent substrate 22. Further, the hologram optical component 23 may be made of a resin, a base 46 that supports the combination prism 45 may be formed in the hologram optical component 23, and the combination prism 45 may be placed directly on the hologram optical component 23.

In this case, because the beam splitter 37, the reflection plane 38, and the polarization divider 39 are integrated into one piece, the number of parts of the optical reproduction apparatus is further reduced. Also, because the hologram optical component 23 is made of a resin, it is possible to freely design the hologram optical component 23 and adjust the length of the optical path.

Also, in this case, because the functions of the beam splitter 37, the reflection plane 38, and the polarization divider 39 are combined into the combination prism 45, it becomes unnecessary to adjust the positions of these construction elements 37–39. This achieves an optical reproduction apparatus that is inexpensive and has stable optical characteristics.

(4) The present embodiment also relates to an optical recording and reproduction apparatus. However, an apparatus specialized in the recording onto optical recording media or the reproduction of optical recording media may be constructed according to this embodiment.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A photodetector unit for use with an optical pickup that irradiates an optical recording medium with a laser beam and receives returning light reflected by the optical recording medium, wherein the optical pickup is constructed to (1) divide the laser beam into a main beam, a preceding sub-beam, and a succeeding sub-beam, (2) direct the main beam, the preceding sub-beam, and the succeeding sub-beam toward the optical recording medium, and (3) divide returning lights of the main beam, the preceding sub-beam, and the succeeding sub-beam respectively into first-fourth main returning lights, first-fourth preceding returning lights, and first-fourth succeeding returning lights, and the photodetector unit comprises:
first-fourth main photodetectors that respectively receive the first-fourth main returning lights;
first-fourth preceding photodetectors that respectively receive the first-fourth preceding returning lights; and
first-fourth succeeding photodetectors that respectively receive the first-fourth succeeding returning lights.

2. The photodetector unit of claim 1,
wherein the first-fourth main photodetectors are arranged in a virtually straight line, and
each of the first-fourth main photodetectors includes at least two photodetecting portions arranged perpendicular to an arrangement direction of the first-fourth main photodetectors.

3. The photodetector unit of claim 2 further comprising:
a first wiring group that includes first signal lines and transmits a received light signal used to perform a push-pull method, the first signal lines being respectively connected to the photodetecting portions of the first-fourth main photodetectors, the first-fourth preceding photodetectors, and the first-fourth succeeding photodetectors;
a second wiring group that includes second signal lines and transmits a received light signal used to perform a differential phase detection method, the second signal lines being respectively connected to the photodetecting portions of the first-fourth main photodetectors; and
a third wiring group that includes third signal lines and transmits a received light signal used to perform a three-beam method, the third signal lines being respectively connected to the first-fourth preceding photodetectors and the first-fourth succeeding photodetectors.

4. The photodetector unit of claim 3 further comprising:
a first circuit that generates a first tracking error signal from the received light signal, which is transmitted from the first wiring group, according to the push-pull method;
a second circuit that generates a second tracking error signal from the received light signal, which is transmitted from the second wiring group, according to the differential phase detection method; and
a third circuit that generates a third tracking error signal from the received light signal, which is transmitted from the third wiring group, according to the three-beam method.

5. The photodetector unit of claim 1 further comprising a laser emitting means for emitting the laser beam.

6. The photodetector unit of claim 5,
wherein the first-fourth main photodetectors are arranged in a virtually straight line, and
the laser emitting means is arranged at virtually a center of an array of the first-fourth main photodetectors.

7. The photodetector unit of claim 5,
wherein photodetecting surfaces of the photodetectors are arranged within virtually the same plane, and
the laser emitting means emits the laser beam perpendicular to the plane.

8. The photodetector unit of claim 1,
wherein the photodetectors are formed on a single semiconductor substrate,
wherein the substrate includes a depression, an inside wall of which is a mirror plane inclined at a certain degree to a surface of the substrate and in which a semiconductor laser element is provided to emit the laser beam toward the mirror plane.

9. The photodetector unit of claim 8,
wherein at least two semiconductor laser elements, which emit laser beams of different wavelengths, are arranged in the depression.

10. The photodetector unit of claim 1,
wherein the photodetectors are formed on a single semiconductor substrate, and
a first semiconductor laser element is provided on the substrate, the first semiconductor laser element emitting the laser beam virtually perpendicular to a surface of the substrate.

11. The photodetector unit of claim 10,
wherein a second semiconductor laser element is further provided on the substrate, the second semiconductor laser element emitting a laser beam virtually perpendicular to the surface of the substrate, the first and second semiconductor laser elements emitting laser beams of different wavelengths.

12. A photodetector unit for use with an optical pickup that irradiates an optical recording medium with a laser beam and receives returning light reflected by the optical recording medium, wherein the optical pickup is constructed to (1) divide the laser beam into a main beam, a preceding sub-beam, and a succeeding sub-beam, (2) direct the main beam, the preceding sub-beam, and the succeeding sub-beam toward the optical recording medium, and (3) divide returning lights of the main beam, the preceding sub-beam, and the succeeding sub-beam respectively into first-fourth main returning lights, first-fourth preceding returning lights, and first-fourth succeeding returning lights, and the photodetector unit comprises:
first-fourth main photodetectors that are arranged in a virtually straight line and respectively receive the first-fourth main returning lights;
first-fourth preceding photodetectors that are arranged in a virtually straight line and parallel to an array of the first-fourth main photodetectors on a side of the array, the first-fourth preceding photodetectors respectively receiving the first-fourth preceding returning lights;

first-fourth succeeding photodetectors that are arranged in a virtually straight line and parallel to the array of the first-fourth main photodetectors on an opposite side of the array, the first-fourth succeeding photodetectors respectively receiving the first-fourth succeeding returning lights;

a current-voltage conversion circuit group that converts current signals, which are obtained from the photodetectors and correspond to received light amounts, into received light signals representing voltage values corresponding to the received light amounts;

a first wiring group that transmits a first received light signal group used to perform a push-pull method, the first received light signal group corresponding to photodetecting portions of the first-fourth main photodetectors, the first-fourth preceding photodetectors, and the first-fourth succeeding photodetectors;

a second wiring group that transmits a second received light signal group used to perform a differential phase detection method, the second received light signal group corresponding to the photodetecting portions of the first-fourth main photodetectors; and a third wiring group that transmits a third received light signal group used to perform a three-beam method, the third received light signal group corresponding to the first-fourth preceding photodetectors and the first-fourth succeeding photodetectors, wherein the photodetectors, the current-voltage conversion circuit group, and the wiring groups are integrally formed on a single semiconductor substrate.

13. The photodetector unit of claim 12 further comprising:

a first circuit that generates a first tracking error signal from the first received light signal group according to the push-pull method;

a second circuit that generates a second tracking error signal from the second received light signal group according to the differential phase detection method; and a third circuit that generates a third tracking error signal from the third received light signal group according to the three-beam method, wherein the first-third circuits are integrally formed on the semiconductor substrate.

14. The photodetector unit of claim 12, wherein the substrate includes a depression, an inside wall of which is a mirror plane inclined at a certain degree to a surface of the substrate and in which a semiconductor laser element is provided to emit the laser beam toward the mirror plane.

15. The photodetector unit of claim 14, wherein at least two semiconductor laser elements, which emit laser beams of different wavelengths, are arranged in the depression.

16. The photodetector unit of claim 12, a first semiconductor laser element is provided on the substrate, the first semiconductor laser element emitting the laser beam virtually perpendicular to a surface of the substrate.

17. The photodetector unit of claim 16, wherein a second semiconductor laser element is further provided on the substrate, the second semiconductor laser element emitting a laser beam virtually perpendicular to the surface of the substrate, the first and second semiconductor laser elements emitting laser beams of different wavelengths.

18. An optical pickup that irradiates an optical recording medium with a laser beam and receives each returning light reflected by the optical recording medium, comprising:

a first semiconductor laser element that emits the laser beam;

a first diffraction grating that divides the laser beam from the first semiconductor laser element into a main beam, a preceding sub-beam, and a succeeding sub-beam;

a lens that has the main beam, preceding sub-beam, and the succeeding sub-beam converge on the optical recording medium;

a second diffraction grating that is provided virtually parallel to the first diffraction grating and generates first-fourth main returning lights, first-fourth preceding returning lights, and first-fourth succeeding returning lights by dividing each of returning lights of the main beam, the preceding sub-beam, and the succeeding sub-beam into a first halt beam and a second half beam and dividing each of the first and second half beams into two beams; and a photodetector unit that includes first-fourth main photodetectors that respectively receive the first-fourth main returning lights, first-fourth preceding photodetectors that respectively receive the first-fourth preceding returning lights, and first-fourth succeeding photodetectors that respectively receive the first-fourth succeeding returning lights, wherein photodetecting surfaces of the photodetectors are arranged within virtually the same plane, and the photodetector unit is arranged so that the photodetecting surfaces are positioned virtually parallel to the first diffraction grating.

19. The optical pickup of claim 18 further comprising a case that contains the photodetector unit and the semiconductor laser element, wherein at least a part, which faces the photodetector unit and the semiconductor laser component, of the case is formed with a transparent member, and the first and second diffraction gratings are provided on the transparent member.

20. The optical pickup of claim 18, wherein the first-fourth main photodetectors are arranged in a virtually straight line and each main photodetector includes at least two photodetecting portions arranged perpendicular to an arrangement direction of the main photodetectors, the optical pickup further comprising:

a first circuit that generates a first tracking error signal from a received light signal, which is transmitted from a first wiring group, according to a push-pull method;

a second circuit that generates a second tracking error signal from a received light signal, which is transmitted from a second wiring group, according to a differential phase detection method; and a third circuit that generates a third tracking error signal from a received light signal, which is transmitted from a third wiring group, according to a three-beam method.

21. The optical pickup of claim 20 further comprising:

a judging means for judging which one of the first-third tracking error signals is suitable for a tracking servo according to amplitude levels of the first-third tracking error signals detected while the tracking servo is off; and a selection circuit that selects one of the first-third tracking error signals for the tracking servo according to a judgement result of the judging means.

22. The optical pickup of claim 18 further comprising a second semiconductor laser element, the first and second laser elements emitting laser beams of different wavelengths.

23. The optical pickup of claim 22,
wherein the judging means judges which one of the first-third tracking error signals is suitable for the tracking servo according to amplitude levels of the first-third tracking error signals that are detected for respective laser beams of different wavelengths while the tracking servo is off.

24. The optical pickup of claim 18,
wherein the photodetector unit includes a depression, an inside wall of which is a mirror plane inclined at a certain degree to the photodetecting surfaces and in which a semiconductor laser element is provided to emit the laser beam toward the mirror plane.

25. The optical pickup of claim 24,
wherein a second semiconductor laser element is further provided in the depression, the first and second semiconductor laser elements emitting laser beams of different wavelengths.

26. An optical reproduction apparatus that reads and reproduces information recorded on an optical recording medium by performing tracking servoing for an optical pickup according to a tracking error signal,
the optical reproduction apparatus comprising:
a detection means for detecting first-third tracking error signals according to different methods;
a judging means for judging which one of the first-third tracking error signals is suitable for a tracking servo according to amplitude levels of the first-third tracking error signals detected while the tracking servo is off; and
a selection means for selecting one of the first-third tracking error signals for the tracking servo according to a judgement result of the judging means.

27. The optical reproduction apparatus of claim 26 further comprising two laser elements that emit laser beams of different wavelengths,
wherein the judging means judges which one of the first-third tracking error signals are suitable for the tracking servo according to amplitude levels of the first-third tracking error signals that are detected for respective laser beams of different wavelengths while the tracking servo is off.

28. The optical reproduction apparatus of claim 26,
wherein the judging means further judges a physical shape of the optical recording medium according to the amplitude levels of the first-third tracking error signals detected while the tracking servo is off.

29. The optical reproduction apparatus of claim 26,
wherein the judging means further judges a type of the optical recording medium or selects candidates for the type of the optical recording medium according to the amplitude levels of the first-third tracking error signals detected while the tracking servo is off.

30. The optical reproduction apparatus of claim 26,
wherein the optical pickup includes a photodetector unit that detects returning light from the optical recording medium, and is constructed to (1) divide a laser beam into a main beam, a preceding sub-beam, and a succeeding sub-beam, (2) direct the main beam, the preceding sub-beam, and the succeeding sub-beam toward the optical recording medium, and (3) divide returning lights of the main beam, the preceding sub-beam, and the succeeding sub-beam respectively into first-fourth main returning lights, first-fourth preceding returning lights, and first-fourth succeeding returning lights,
wherein the photodetector unit comprises:
first-fourth main photodetectors that respectively receive the first-fourth main returning lights;
first-fourth preceding photodetectors that respectively receive the first-fourth preceding returning lights; and
first-fourth succeeding photodetectors that respectively receive the first-fourth succeeding returning lights.

31. The optical reproduction apparatus of claim 26,
wherein the optical pickup irradiates the optical recording medium with a laser beam and receives each returning light reflected by the optical recording medium,
the optical pickup comprising:
a first semiconductor laser element that emits the laser beam;
a first diffraction grating that divides the laser beam from the first semiconductor laser element into a main beam, a preceding sub-beam, and a succeeding sub-beam;
a lens that has the main beam, preceding sub-beam, and the succeeding sub-beam converge on the optical recording medium;
a second diffraction grating that is provided virtually parallel to the first diffraction grating and generates first-fourth main returning lights, first-fourth preceding returning lights, and first-fourth succeeding returning lights by dividing each of returning lights of the main beam, the preceding sub-beam, and the succeeding sub-beam into a first half beam and a second half beam and dividing each of the first and second half beams into two beams; and
a photodetector unit that includes first-fourth main photodetectors that respectively receive the first-fourth main returning lights, first-fourth preceding photodetectors that respectively receive the first-fourth preceding returning lights, and first-fourth succeeding photodetectors that respectively receive the first-fourth succeeding returning lights,
wherein photodetecting surfaces of the photodetectors are arranged within virtually the same plane, and
the photodetector unit is arranged so that the photodetecting surfaces are positioned virtually parallel to the first diffraction grating.

32. An optical recording apparatus that records information onto an optical recording medium by performing tracking servoing for an optical pickup according to a tracking error signal,
the optical recording apparatus comprising:
a detection means for detecting first-third tracking error signals according to different methods;
a judging means for judging which one of the first-third tracking error signals is suitable for a tracking servo according to amplitude levels of the first-third tracking error signals detected while the tracking servo is off; and
a selection means for selecting one of the first-third tracking error signals for the tracking servo according to a judgement result of the judging means.

33. The optical recording apparatus of claim 32 further comprising two laser elements that emit laser beams of different wavelengths, wherein the judging means judges which one of the first-third tracking error signals are suitable for the tracking servo according to amplitude levels of the first-third tracking error signals that are detected for respective laser beams of different wavelengths while the tracking servo is off.

34. The optical recording apparatus of claim 32,
wherein the judging means further judges a physical shape of the optical recording medium according to the amplitude levels of the first-third tracking error signals detected while the tracking servo is off.

35. The optical recording apparatus of claim 32,
wherein the judging means further judges a type of the optical recording medium or selects candidates for the type of the optical recording medium according to the amplitude levels of the first-third tracking error signals detected while the tracking servo is off.

36. The optical recording apparatus of claim 32,
wherein the optical pickup includes a photodetector unit that detects returning light from the optical recording medium, and is constructed to (1) divide a laser beam into a main beam, a preceding sub-beam, and a succeeding sub-beam, (2) direct the main beam, the preceding sub-beam, and the succeeding sub-beam toward the optical recording medium, and (3) divide returning lights of the main beam, the preceding sub-beam, and the succeeding sub-beam respectively into first-fourth main returning lights, first-fourth preceding returning lights, and first-fourth succeeding returning lights,
wherein the photodetector unit comprises:
first-fourth main photodetectors that respectively receive the first-fourth main returning lights;
first-fourth preceding photodetectors that respectively receive the first-fourth preceding returning lights; and
first-fourth succeeding photodetectors that respectively receive the first-fourth succeeding returning lights.

37. The optical recording apparatus of claim 32,
wherein the optical pickup irradiates the optical recording medium with a laser beam and receives each returning light reflected by the optical recording medium,
the optical pickup comprising:
a first semiconductor laser element that emits the laser beam;
a first diffraction grating that divides the laser beam from the first semiconductor laser element into a main beam, a preceding sub-beam, and a succeeding sub-beam;
a lens that has the main beam, preceding sub-beam, and the succeeding sub-beam converge on the optical recording medium;
a second diffraction grating that is provided virtually parallel to the first diffraction grating and generates first-fourth main returning lights, first-fourth preceding returning lights, and first-fourth succeeding returning lights by dividing each of returning lights of the main beam, the preceding sub-beam, and the succeeding sub-beam into a first half beam and a second half beam and dividing each of the first and second half beams into two beams; and
a photodetector unit that includes first-fourth main photodetectors that respectively receive the first-fourth main returning lights, first-fourth preceding photodetectors that respectively receive the first-fourth preceding returning lights, and first-fourth succeeding photodetectors that respectively receive the first-fourth succeeding returning lights,
wherein photodetecting surfaces of the photodetectors are arranged within virtually the same plane, and
the photodetector unit is arranged so that the photodetecting surfaces are positioned virtually parallel to the first diffraction grating.

38. An optical pickup that reads information from an optical recording medium by dividing a laser beam into a main beam, a preceding sub-beam, and a succeeding sub-beam, directing the beams toward an optical recording medium, and receiving each returning light reflected by the optical recording medium,
the optical pickup comprising:
a light dividing component that optically divides each returning light into four divided beams; and
a photodetector unit including first-fourth main photodetectors that respectively receive the divided beams of the returning light of the main beam, first-fourth preceding photodetectors that respectively receive the divided beams of the returning light of the preceding sub-beam, and first-fourth succeeding photodetectors that respectively receive the divided beams of the returning light of the succeeding sub-beam.

39. The optical pickup of claim 38,
wherein the light dividing component includes two light diffraction elements that respectively receive and diffract a first half and a second half of each returning light, and
each photodetector is arranged to receive one diffraction light from the light diffraction elements.

40. The optical pickup of claim 39,
wherein the light diffraction elements are each a hologram element and respectively diffract a received half of each returning light into a positive first-order diffraction light and a negative first-order diffraction light to divide each returning light into four beams.

* * * * *